US012542111B2

(12) United States Patent
Yang et al.

(10) Patent No.: US 12,542,111 B2
(45) Date of Patent: Feb. 3, 2026

(54) DISPLAY DEVICE AND ELECTRONIC DEVICE INCLUDING THE SAME

(71) Applicant: Samsung Display Co., Ltd., Yongin-Si (KR)

(72) Inventors: Jin-Wook Yang, Yongin-si (KR); Sehyuk Park, Yongin-si (KR); Youngha Sohn, Yongin-si (KR); Donggyu Lee, Yongin-si (KR); Jae-Hyeon Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/082,187

(22) Filed: Mar. 18, 2025

(65) Prior Publication Data

US 2026/0011314 A1 Jan. 8, 2026

(30) Foreign Application Priority Data

Jul. 8, 2024 (KR) ........................ 10-2024-0089708

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2310/0275* (2013.01); *G09G 2320/0626* (2013.01); *G09G 2330/021* (2013.01)

(58) Field of Classification Search
CPC ................... G09G 3/3291; G09G 3/32; G09G 2310/0275; G09G 2320/0626; G09G 2330/021; H10D 86/021
See application file for complete search history.

(56) References Cited

U.S. PATENT DOCUMENTS

| | | | | |
|---|---|---|---|---|
| 11,263,976 | B2 | 3/2022 | Yang et al. | |
| 11,640,794 | B2 | 5/2023 | Yang et al. | |
| 11,961,463 | B2 | 4/2024 | Yang et al. | |
| 11,961,474 | B2 | 4/2024 | Yang et al. | |
| 2021/0295781 | A1* | 9/2021 | Kim | G09G 3/3233 |
| 2021/0327350 | A1* | 10/2021 | Nam | G09G 3/3233 |

(Continued)

FOREIGN PATENT DOCUMENTS

| | | | |
|---|---|---|---|
| KR | 10-2021-0100785 | A | 8/2021 |
| KR | 10-2023-0139915 | A | 10/2023 |

(Continued)

*Primary Examiner* — Abdul-Samad A Adediran
(74) *Attorney, Agent, or Firm* — Innovation Counsel LLP

(57) ABSTRACT

A display device includes a display panel including a pixel, and a panel driver providing a reference voltage and a data voltage to the pixel. The pixel emits a light corresponding to a difference between the reference voltage and the data voltage. The panel driver includes a power management circuit generating an analog power supply voltage, and providing the analog power supply voltage to a data driver. A driving mode of the display device includes a first mode emitting the light at a first luminance for a first gray level, and a second mode emitting the light at a second luminance higher than the first luminance for the first gray level. The analog power supply voltage has a first analog power supply voltage level in the first mode, and a second analog power supply voltage level higher than the first analog power supply voltage level in the second mode.

20 Claims, 10 Drawing Sheets

(56) References Cited

U.S. PATENT DOCUMENTS

| | | | | |
|---|---|---|---|---|
| 2023/0056897 | A1* | 2/2023 | Kim | H10D 86/021 |
| 2023/0401997 | A1 | 12/2023 | Jeon et al. | |
| 2024/0404464 | A1 | 12/2024 | Yang et al. | |

FOREIGN PATENT DOCUMENTS

| | | | |
|---|---|---|---|
| KR | 10-2024-0033711 | A | 3/2024 |
| KR | 10-2024-0173244 | A | 12/2024 |

* cited by examiner

DISPLAY DEVICE AND ELECTRONIC DEVICE INCLUDING THE SAME

CROSS-REFERENCE TO RELATED APPLICATION(S)

This application claims priority under 35 U.S.C. § 119 to Korean Patent Application No. 10-2024-0089708, filed on Jul. 8, 2024 in the Korean Intellectual Property Office KIPO, the contents of which are herein incorporated by reference in their entireties.

BACKGROUND

1. Field

Embodiments of the present inventive concept relate to a display device and an electronic device. More particularly, embodiments of the present inventive concept relate to the display device including a pixel emitting a light at a luminance corresponding to a difference between a reference voltage and a data voltage, and the electronic device including the display device.

2. Description of the Related Art

Unlike a liquid crystal display (LCD) device which includes a backlight unit, a self-luminous display device, like an organic light emitting diode (OLED) display device, does not require an independent light source, so that the self-luminous display device may have a thin thickness and a light weight. In addition, the self-luminous display device may have a high brightness, a fast response speed and a high image quality.

On the other hand, a method of reducing a voltage of a maximum grayscale value of the self-luminous display device to increase the luminance has limitations in implementing an ultra high luminance mode and a low power mode.

SUMMARY

Embodiments of the present inventive concept provide a display device operating in an ultra high luminance mode with a decreased power consumption.

Embodiments of the present inventive concept provide an electronic device including the display device.

According to an embodiment of the present inventive concept, a display device includes a display panel including a pixel, and a panel driver configured to provide a reference voltage and a data voltage to the pixel. The pixel is configured to emit a light at a luminance corresponding to a difference between the reference voltage and the data voltage. The panel driver includes a power management circuit configured to generate an analog power supply voltage, and to provide the analog power supply voltage to a data driver. A driving mode of the display device includes a first mode in which the pixel is configured to emit a light at a first luminance for a first grayscale value, and a second mode in which the pixel is configured to emit a light at a second luminance higher than the first luminance of the first mode for the first grayscale value. The analog power supply voltage in the first mode has a first analog power supply voltage level. The analog power supply voltage in the second mode has a second analog power supply voltage level higher than the first analog power supply voltage level.

In an embodiment, the reference voltage in the first mode may have a first reference voltage level lower than the first analog power supply voltage level. The reference voltage in the second mode may have a second reference voltage level higher than the first reference voltage level.

In an embodiment, the data voltage corresponding to a minimum grayscale value may be a minimum grayscale voltage. The minimum grayscale voltage in the first mode may have a first minimum grayscale voltage level lower than the first analog power supply voltage level and higher than the first reference voltage level. The minimum grayscale voltage in the second may have a second minimum grayscale voltage level higher than the first minimum grayscale voltage level.

In an embodiment, a difference between the analog power supply voltage and the minimum grayscale voltage may be constant in the first mode and the second mode and a difference between the minimum grayscale voltage and the reference voltage may be constant in the first mode and the second mode.

In an embodiment, the driving mode of the display device may further include a third mode in which the pixel is configured to emit a light at a third luminance higher than the second luminance of the second mode for the first grayscale value, and a fourth mode in which the pixel is configured to emit a light at a fourth luminance higher than the third luminance of the third mode for the first grayscale value. The analog power supply voltage in the third mode may have a third analog power supply voltage level higher than the second analog power supply voltage level. The analog power supply voltage in the fourth mode may have a fourth analog power supply voltage level higher than the third analog power supply voltage level.

In an embodiment, the reference voltage in the third mode may have a third reference voltage level higher than the second reference voltage level. The reference voltage in the fourth mode may have a fourth reference voltage level higher than the third reference voltage level.

In an embodiment, the minimum grayscale voltage in the third mode may have a third minimum grayscale voltage level higher than the second minimum grayscale voltage level. The minimum grayscale voltage in the fourth mode may have a fourth minimum grayscale voltage level higher than the third minimum grayscale voltage level.

In an embodiment, a maximum voltage of a maximum output range of the data voltage provided to the pixel by the panel driver may be a maximum data voltage. The fourth minimum grayscale voltage level may be equal to a level of the maximum data voltage.

In an embodiment, a difference between the analog power supply voltage and the minimum grayscale voltage may be constant in the first mode, the second mode, the third mode and the fourth mode and a difference between the minimum grayscale voltage and the reference voltage may be constant in the first mode, the second mode, the third mode and the fourth mode.

In an embodiment, the data voltage corresponding to a maximum grayscale value may be a maximum grayscale voltage. A level of the maximum grayscale voltage may be constant in the first mode, the second mode, the third mode and the fourth mode. The level of the maximum grayscale voltage may be lower than the first reference voltage level.

In an embodiment, a minimum voltage of a maximum output range of the data voltage provided to the pixel by the panel driver may be a minimum data voltage. The maximum grayscale voltage may be equal to the minimum data voltage.

In an embodiment, a first driving voltage to drive the pixel may be applied to the pixel. The first driving voltage may be constant in the first mode, the second mode, the third mode and the fourth mode.

In an embodiment, the first driving voltage may have the third reference voltage level.

In an embodiment, the first driving voltage may have the second reference voltage level.

In an embodiment, a second driving voltage to drive the pixel may be applied to the pixel. The second driving voltage may be lower than the first driving voltage. The second driving voltage may have a first driving level in the first mode and the second mode. The second driving voltage in the third mode may have a second driving level lower than the first driving level. The second driving voltage in the fourth mode may have a third driving level lower than the second driving level.

In an embodiment, the pixel may include a light emitting element, a driving transistor including a control electrode, a first electrode and a second electrode, a first transistor including a control electrode configured to receive a first gate signal, a first electrode configured to receive the data voltage and a second electrode connected to a first electrode of a first capacitor, a second transistor including a control electrode configured to receive a second gate signal, a first electrode connected to the first electrode of the first capacitor and a second electrode configured to receive the reference voltage, and the first capacitor including the first electrode connected to the second electrode of the first transistor and a second electrode connected to the control electrode of the driving transistor.

According to an embodiment of the present inventive concept, a display device includes a display panel including a pixel, and a panel driver configured to provide a reference voltage and a data voltage to the pixel. The panel driver includes a power management circuit configured to generate an analog power supply voltage, and to provide the analog power supply voltage to a data driver. The power management circuit is configured to control the analog power supply voltage according to a luminance for a first grayscale value. The pixel includes a light emitting element, a driving transistor including a control electrode, a first electrode and a second electrode, a first transistor including a control electrode configured to receive a first gate signal, a first electrode configured to receive the data voltage and a second electrode connected to a first electrode of a first capacitor, a second transistor including a control electrode configured to receive a second gate signal, a first electrode connected to the first electrode of the first capacitor and a second electrode configured to receive the reference voltage, and the first capacitor including the first electrode connected to the second electrode of the first transistor and a second electrode connected to the control electrode of the driving transistor.

In an embodiment, when the luminance for the first grayscale value is a first luminance, the analog power supply voltage may have a first analog power supply voltage level. When the luminance for the first grayscale value is a second luminance higher than the first luminance, the analog power supply voltage may have a second analog power supply voltage level higher than the first analog power supply voltage level.

In an embodiment, the data voltage corresponding to a minimum grayscale value may be a minimum grayscale voltage. When the analog power supply voltage has the first analog power supply voltage level, the minimum grayscale voltage may have a first minimum grayscale voltage level. When the analog power supply voltage has the second analog power supply voltage level, the minimum grayscale voltage may have a second minimum grayscale voltage level higher than the first minimum grayscale voltage level.

In an embodiment, when the luminance for the first grayscale value is a first luminance, the reference voltage may have a first reference voltage level. When the luminance for the first grayscale value is a second luminance higher than the first luminance, the reference voltage may have a second reference voltage level higher than the first reference voltage level.

In an embodiment, the data voltage corresponding to a minimum grayscale value may be a minimum grayscale voltage. A difference between the analog power supply voltage and the minimum grayscale voltage may be constant regardless of the luminance for the first grayscale value and a difference between the minimum grayscale voltage and the reference may be constant regardless of the luminance for the first grayscale value.

In an embodiment, the data voltage corresponding to a maximum grayscale value may be a maximum grayscale voltage. The maximum grayscale voltage may be constant regardless of the luminance for the first grayscale value and the maximum grayscale voltage is lower than the reference voltage.

According to an embodiment of the present inventive concept, an electronic device includes a display panel including a pixel, a data driver configured to generate a data voltage and to provide the data voltage to the pixel, a power management circuit configured to generate an analog power supply voltage and to provide the analog power supply voltage to the data driver, a controller configured to control the power management circuit and the data driver, and a processor configured to provide input image data and an input control signal to the controller. The pixel is configured to emit a light at a luminance corresponding to a difference between a reference voltage and the data voltage. A driving mode of the electronic device includes a first mode in which the pixel is configured to emit a light at a first luminance for a first grayscale value and a second mode in which the pixel is configured to emit a light at a second luminance higher than the first luminance of the first mode for the first grayscale value. In the first mode, the power management circuit is configured to generate the analog power supply voltage having a first analog power supply voltage level and to provide the analog power supply voltage having the first analog power supply voltage level to the data driver, and the data driver is configured to generate the data voltage based on the analog power supply voltage having the first analog power supply voltage level. In the second mode, the power management circuit is configured to generate the analog power supply voltage having a second analog power supply voltage level higher than the first analog power supply voltage level and to provide the analog power supply voltage having the second analog power supply voltage level to the data driver, and the data driver is configured to generate the data voltage based on the analog power supply voltage having the second analog power supply voltage level.

In an embodiment, the reference voltage in the first mode may have a first reference voltage level lower than the first analog power supply voltage level. The reference voltage in the second mode may have a second reference voltage level higher than the first reference voltage level.

In an embodiment, the data voltage corresponding to a minimum grayscale value may be a minimum grayscale voltage. The minimum grayscale voltage in the first mode may have a first minimum grayscale voltage level lower than the first analog power supply voltage level and higher than the first reference voltage level. The minimum grayscale voltage in the second mode may have a second minimum grayscale voltage level higher than the first minimum grayscale voltage level.

In an embodiment, a difference between the analog power supply voltage and the minimum grayscale voltage may be constant in the first mode and the second mode and a difference between the minimum grayscale voltage and the reference voltage may be constant in the first mode and the second mode.

In an embodiment, the driving mode of the electronic device may further include a third mode in which the pixel is configured to emit a light at a third luminance higher than the second luminance of the second mode for the first grayscale value and a fourth mode in which the pixel is configured to emit a light at a fourth luminance higher than the third luminance of the third mode for the first grayscale value. In the third mode, the power management circuit may be configured to generate the analog power supply voltage having a third analog power supply voltage level higher than the second analog power supply voltage level and to provide the analog power supply voltage having the third analog power supply voltage level to the data driver and the data driver is configured to generate the data voltage based on the analog power supply voltage having the third analog power supply voltage level. In the fourth mode, the power management circuit may be configured to generate the analog power supply voltage having a fourth analog power supply voltage level higher than the third analog power supply voltage level and to provide the analog power supply voltage having the fourth analog power supply voltage level to the data driver and the data driver is configured to generate the data voltage based on the analog power supply voltage having the fourth analog power supply voltage level.

In an embodiment, the reference voltage may have a third reference voltage level higher than the second reference voltage level in the third mode. The reference voltage may have a fourth reference voltage level higher than the third reference voltage level in the fourth mode.

In an embodiment, the minimum grayscale voltage may have a third minimum grayscale voltage level higher than the second minimum grayscale voltage level in the third mode. The minimum grayscale voltage may have a fourth minimum grayscale voltage level higher than the third minimum grayscale voltage level in the fourth mode.

In an embodiment, a difference between the analog power supply voltage and the minimum grayscale voltage may be constant in the first mode, the second mode, the third mode and the fourth mode and a difference between the minimum grayscale voltage and the reference voltage may be constant in the first mode, the second mode, the third mode and the fourth mode.

In an embodiment, the data voltage corresponding to a maximum grayscale value may be a maximum grayscale voltage. The maximum grayscale voltage may be constant in the first mode, the second mode, the third mode and the fourth mode. The maximum grayscale voltage may be lower than the reference voltage.

In an embodiment, the pixel may include a light emitting element, a driving transistor including a control electrode, a first electrode and a second electrode, a first transistor including a control electrode configured to receive a first gate signal, a first electrode configured to receive the data voltage and a second electrode connected to a first electrode of a first capacitor, a second transistor including a control electrode configured to be applied a second gate signal, a first electrode connected to the first electrode of the first capacitor and a second electrode configured to receive the reference voltage, and the first capacitor including the first electrode connected to the second electrode of the first transistor and a second electrode connected to the control electrode of the driving transistor.

According to the display device, a pixel may emit a light at a luminance corresponding to a difference between a reference voltage and a data voltage, a maximum grayscale voltage may be constant regardless of a luminance mode, and the reference voltage, a minimum grayscale voltage and an analog power supply voltage may be change according to the luminance mode. In addition, regardless of the luminance mode, a difference between the analog power supply voltage and the minimum grayscale voltage and a difference between the reference voltage and the minimum grayscale voltage may be constant. Accordingly, the display device may be operated in an ultra high luminance mode, and a power consumption of the display device may decrease.

BRIEF DESCRIPTION OF THE DRAWINGS

The above and other features and advantages of the inventive concept will become more apparent from the following detailed description in conjunction with the accompanying drawings.

DETAILED DESCRIPTION OF THE EMBODIMENTS

Figure 1:
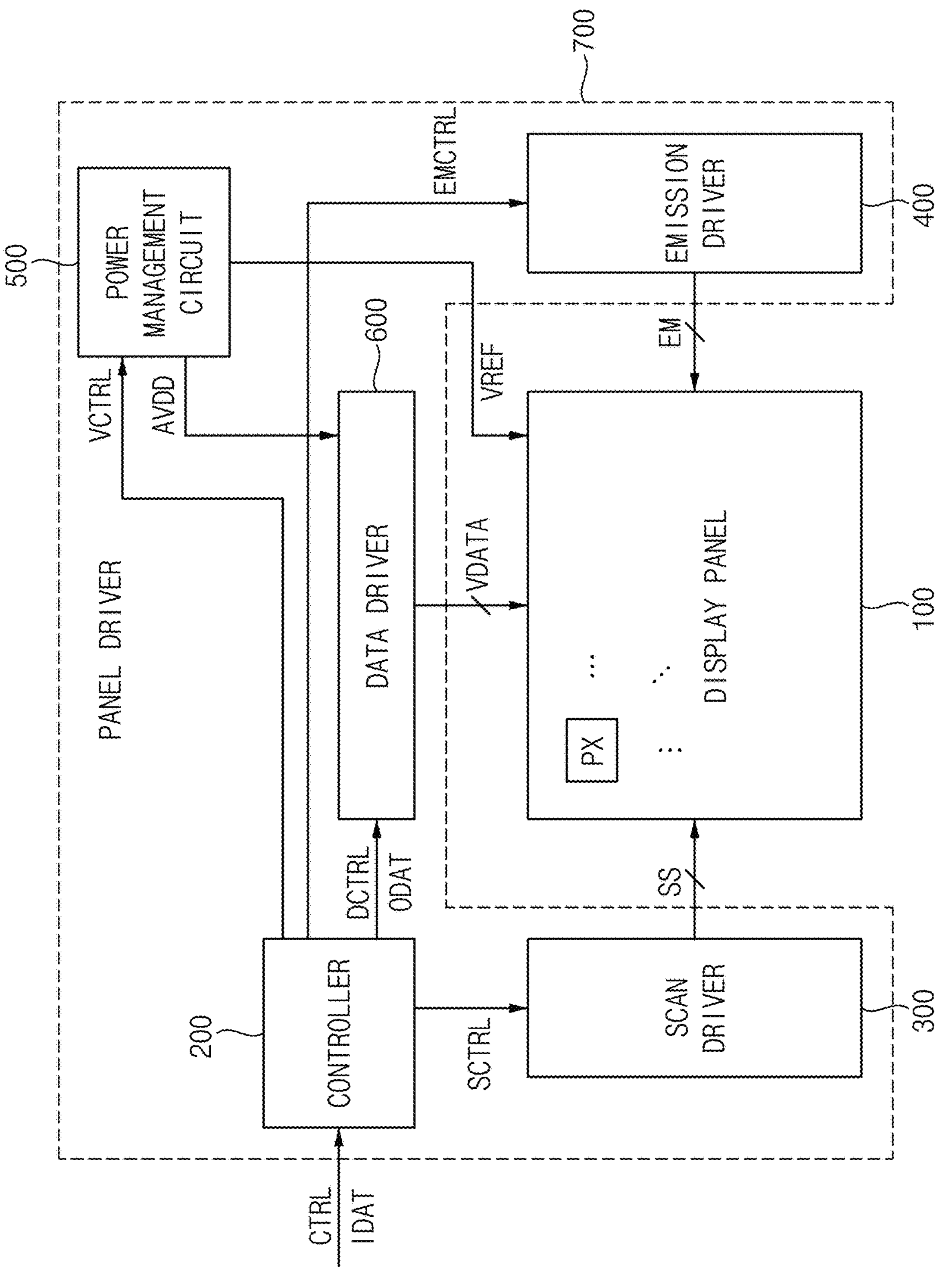
FIG. 1 is a block diagram illustrating a display device according to an embodiment of the present inventive concept.

Hereinafter, display devices according to embodiments of the present disclosure will be described in more detail with reference to the accompanying drawings. The same reference numerals are used for the same components in the drawings, and redundant descriptions of the same components will be omitted.

FIG. 1 is a block diagram illustrating a display device according to an embodiment of the present inventive concept.

Referring to FIG. 1, the display device according to an embodiment of the present inventive concept may include a display panel 100 including a plurality of pixels PX and a panel driver 700 driving the display panel 100. In an embodiment, the panel driver 700 may include a data driver 600 providing data voltages VDATA to the pixels PX, a scan driver 300 providing scan signals SS to the pixels PX, an emission driver 400 providing emission signals EM to the pixels PX, a power management circuit 500 providing voltages AVDD and VREF to the display device, and a controller 200 controlling an operation of the display device.

The display panel 100 may include the pixels PX arranged in a matrix form having a plurality of rows and a plurality of columns. Each of the pixels PX receives a reference voltage VREF and the data voltage VDATA from the panel driver 700. Each of the pixels PX may emit a light at the luminance proportional to the square of a difference between the reference voltage VREF and the data voltage VDATA. Accordingly, when the difference between the reference voltage VREF and the data voltage VDATA is constant, each of the pixels PX may emit a light at a constant luminance regardless of a voltage level of the reference voltage VREF.

The scan driver 300 may sequentially provide the scan signals SS to the pixels PX on a row-by-row basis based on a scan control signal SCTRL. In an embodiment, the scan signals SS may include an initialization signal GI, a compensation signal GC, a compensation initialization signal GP, a writing signal GW and a bypass signal GB, but the types of the scan signals SS are not limited thereto. In an embodiment, the scan control signal SCTRL may include a scan start signal and a scan clock signal, but the type of the scan control signal SCTRL is not limited thereto. In addition, in an embodiment, the scan driver 300 may be integrated or formed in the display panel 100. In an embodiment, the scan driver 300 may be implemented as one or more integrated circuits.

The emission driver 400 may sequentially provide the emission signals EM to the pixels PX on a row-by-row basis based on an emission control signal EMCTRL received from the controller 200. In an embodiment, the emission signals EM may include a first emission signal EM1 and a second emission signal EM2, but the types of the emission signals EM are not limited thereto. In an embodiment, the emission control signal EMCTRL may include an emission start signal and an emission clock signal, but the type of the emission control signal EMCTRL is not limited thereto. In an embodiment, the emission driver 400 may be integrated or formed in the display panel 100. In an embodiment, the emission driver 400 may be implemented as one or more integrated circuits.

Although FIG. 1 illustrates that the scan driver 300 is disposed at a first side of the display panel 100 and the emission driver 400 is disposed at a second side of the display panel 100 opposite to the first side of the display panel for convenience of explanation, the present inventive concept is not limited thereto. For example, both of the scan driver 300 and the emission driver 400 may be disposed at the first side of the display panel 100. For example, both of the scan driver 300 and the emission driver 400 may be disposed at both sides of the display panel 100. For example, the scan driver 300 and the emission driver 400 may be integrally formed.

The power management circuit 500 may provide an analog power supply voltage AVDD to the panel driver 700 based on a voltage control signal VCTRL received from the controller 200. For example, the power management circuit 500 may provide the analog power supply voltage AVDD to output buffers of the data driver 600. In an embodiment, the power management circuit 500 may further provide a logic power supply voltage to a logic circuit of the panel driver 700. In addition, the power management circuit 500 may provide the reference voltage VREF to the pixels PX of the display panel 100 based on the voltage control signal VCTRL received from the controller 200. In an embodiment, the power management circuit 500 may provide a first driving voltage, a second driving voltage, an initialization voltage and an anode initialization voltage to the pixels PX of the display panel 100. In an embodiment, the power management circuit 500 may be implemented as an integrated circuit, and the integrated circuit may be referred to as a power management integrated circuit (PMIC). In an embodiment, the power management circuit 500 may be implemented in an integrated circuit of the controller 200 or the data driver 600.

The data driver 600 may provide the data voltages VDATA to the pixels PX based on a data control signal DCTRL and output image data ODAT received from the controller 200. In an embodiment, the data control signal DCTRL may include an output data enable signal, a horizontal start signal and a load signal, but the type of the data control signal DCTRL is not limited thereto. In an embodiment, the data driver 600 and the controller 200 may be implemented as a single integrated circuit, and the single integrated circuit may be referred to as a timing controller embedded data driver (TED). In an embodiment, the data driver 600 and the controller 200 may be implemented as separate integrated circuits.

The data driver 600 may generate the data voltage VDATA based on the analog power supply voltage AVDD received from the power management circuit 500. For example, the data driver 600 may generate a minimum grayscale voltage, which is the data voltage VDATA corresponding to a minimum grayscale value.

The controller 200 (e.g. a timing controller (T-CON)) may receive input image data IDAT and a control signal CTRL from an external host processor (e.g. a graphics processing unit (GPU), an application processor (AP) or a graphics card). In an embodiment, the control signal CTRL may include a vertical synchronization signal, a horizontal synchronization signal, an input data enable signal, a master clock signal, etc., but the type of the control signal CTRL is not limited thereto. The controller 200 may generate the output image data ODAT, the data control signal DCTRL, the scan control signal SCTRL and the emission control signal EMCTRL based on the input image data IDAT and the control signal CTRL, may control the data driver 600 by providing the output image data ODAT and the data control signal DCTRL to the data driver 600, may control the scan driver 300 by providing the scan control signal SCTRL to the scan driver 300, and may control the emission driver 400 by providing the emission control signal EMCTRL to the emission driver 400.

The display device according to an embodiment of the present inventive concept may operate in a first mode, a second mode, a third mode and a fourth mode. The luminance of a light emitted from the pixels PX may vary according to the first mode, the second mode, the third mode and the fourth mode. For example, as a driving mode of the display device is sequentially changed from the first mode to the fourth mode, the luminance of a light emitted from the pixels PX may increase. The voltage level of the reference voltage VREF may vary according to the first mode, the second mode, the third mode and the fourth mode. A level of the analog power supply voltage AVDD may be changed according to the first mode, the second mode, the third mode and the fourth mode. For example, as the driving mode of the display device is sequentially changed from the first mode to the fourth mode, the analog power supply voltage AVDD may increase, and the reference voltage VREF may increase. A level of the minimum grayscale voltage corresponding to the minimum grayscale value may be changed according to the change of the driving mode from the first mode to the fourth mode. For example, when the level of the analog power supply voltage AVDD increases in the first mode, the second mode, the third mode and the fourth mode, the level of the minimum grayscale voltage may increase. A maximum grayscale voltage is the data voltage VDATA corresponding to a maximum grayscale value. The maximum grayscale voltage may be constant in the first mode, the second mode, the third mode and the fourth mode.

The power management circuit 500 of the display device according to an embodiment of the present inventive concept may change the level of the analog power supply voltage AVDD according to the luminance for a first grayscale value. At this time, the first grayscale value may be a 255 grayscale value out of 0 to 255 grayscale levels. For example, the power management circuit 500 may increase the analog power supply voltage AVDD as the luminance for the first grayscale value increases. In addition, the data driver 600 may change the minimum grayscale voltage based on the analog power supply voltage AVDD. For example, the data driver 600 may increase the minimum grayscale voltage based on the analog power supply voltage AVDD. At this time, the minimum grayscale value may be a 0 grayscale value out of 0 to 255 grayscale levels. In addition, the power management circuit 500 of the display device may change the reference voltage VREF according to the luminance for the first grayscale value. For example, the power management circuit 500 may increase the reference voltage VREF as the luminance for the first grayscale value increases.

Figure 2:
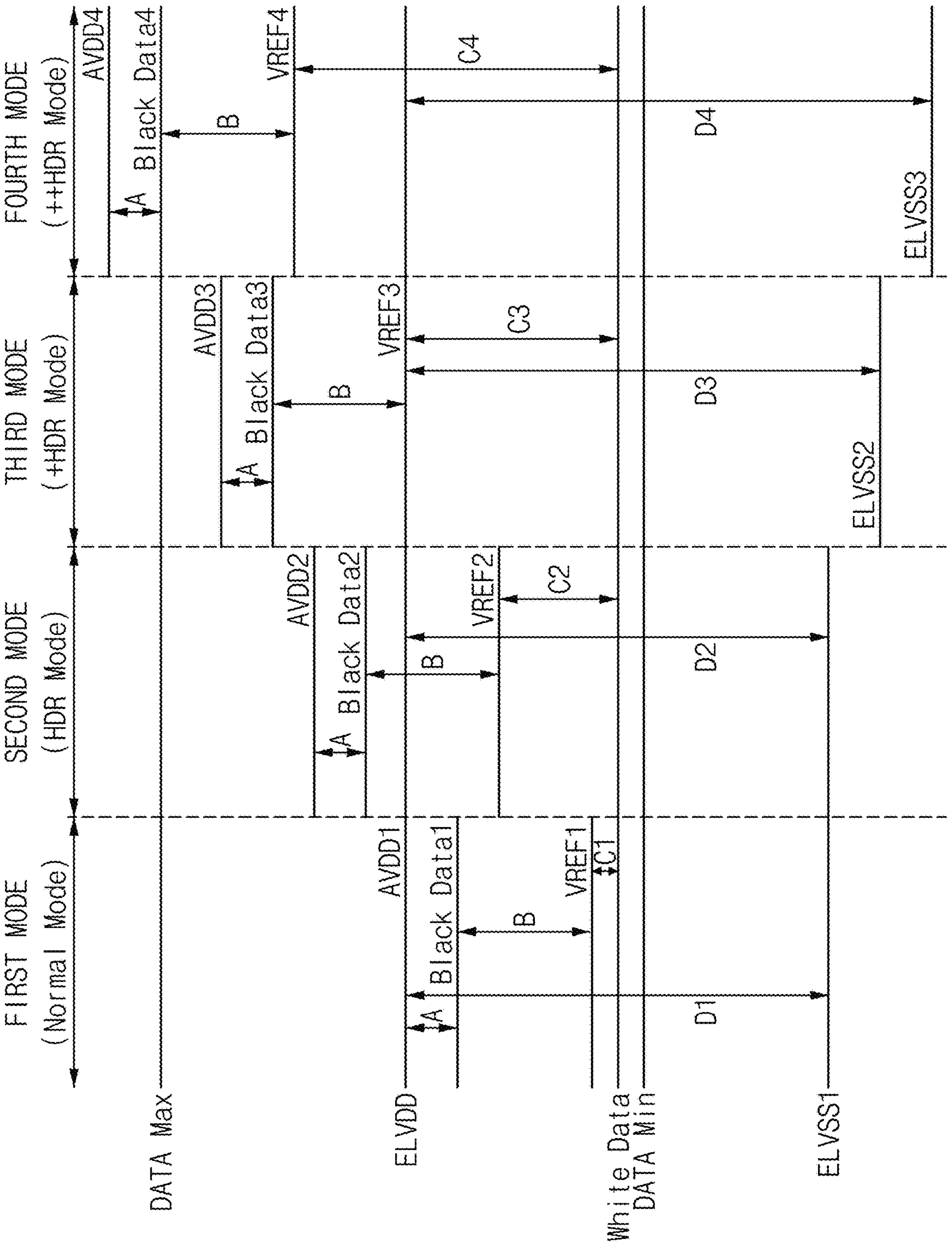
FIG. 2 is a diagram illustrating an example of voltages provided to a pixel by a panel driver of FIG. 1 according to a first mode to a fourth mode.

FIG. 2 is a diagram illustrating an example of voltages provided to the pixel PX by the panel driver 700 of FIG. 1 according to the first mode, the second mode, the third mode and the fourth mode.

Referring to FIGS. 1 and 2, the panel driver 700 included in the display device may provide the reference voltage VREF, the first driving voltage ELVDD and the second driving voltage to the pixels PX. The power management circuit 500 may generate the analog power supply voltage AVDD and provide the analog power supply voltage AVDD to the data driver 600. The data driver 600 may provide the data voltage VDATA to the pixels PX. A maximum voltage which the data driver 600 can provide to the pixels PX regardless of the driving mode of the display device is a maximum data voltage DATA Max. A minimum voltage which the data driver 600 can provide to the pixels PX regardless of the driving mode of the display device is a minimum data voltage DATA Min.

The driving mode of the display device according to an embodiment of the present inventive concept may include the first mode Normal Mode, the second mode HDR Mode, the third mode +HDR Mode and the fourth mode ++HDR Mode. The first mode Normal Mode may be a driving mode in which the pixels PX emit a light at a normal luminance. For example, the pixels PX may emit a light at the normal luminance for the first grayscale value in the first mode Normal Mode. At this time, the first grayscale value may be the 255 grayscale value among the grayscale values from 0 to 255. The second mode HDR Mode (high dynamic range mode) may be the driving mode in which the pixels PX emit a light at a high luminance which is higher than the normal luminance. For example, the pixels PX may emit a light at the high luminance which is higher than the normal luminance of the first mode Normal Mode for the first grayscale value in the second mode HDR Mode. The third mode +HDR Mode may be the driving mode in which the pixels PX emit a light at a first ultra high luminance which is higher than the high luminance. For example, the pixels PX may emit a light at the first ultra high luminance which is higher than the high luminance for the first grayscale value in the third mode +HDR Mode. The fourth mode ++HDR Mode may be the driving mode in which the pixels PX emit a light at a second ultra high luminance which is higher than the first ultra high luminance. For example, the pixels PX may emit a light at the second ultra high luminance which is higher than the first ultra high luminance for the first grayscale value in the fourth mode ++HDR Mode. The driving mode of the display device of the present disclosure is not limited to the first mode Normal Mode, the second mode HDR Mode, the third mode +HDR Mode and the fourth mode ++HDR Mode, as exemplified above.

The level of the reference voltage VREF and the level of the analog power supply voltage AVDD may be changed according to the driving mode of the display device, e.g., the first mode Normal Mode, the second mode HDR Mode, the third mode +HDR Mode and the fourth mode ++HDR Mode. The power management circuit 500 may change the level of the analog power supply voltage AVDD according to the driving mode, and output the analog power supply voltage AVDD to the data driver 600. In addition, the power management circuit 500 may change the level of the reference voltage VREF according to the driving mode, and output the reference voltage VREF to the pixels PX. As the level of the analog power supply voltage AVDD changes, the level of the minimum grayscale voltage may vary. For example, when the level of the analog power supply voltage AVDD increases, the level of the minimum grayscale voltage may increase. At this time, a level of the maximum grayscale voltage White Data may be the same in the first mode Normal Mode, the second mode HDR Mode, the third mode +HDR Mode and the fourth mode ++HDR Mode. The pixels PX may emit a light at the normal luminance in the first mode Normal Mode. The reference voltage VREF may have a first reference voltage level VREF1. The level of the maximum grayscale voltage White Data may be lower than the first reference voltage level VREF1. The minimum grayscale voltage of the first mode Normal Mode may have a first minimum grayscale voltage level Black Data1 which is higher than the first reference voltage level VREF1. The analog power supply voltage AVDD may have a first analog power supply voltage level AVDD1 which is higher than the first minimum grayscale voltage level Black Data1 in the first mode Normal Mode. A level of the first driving voltage ELVDD may be same as the first analog power supply voltage level AVDD1 in the first mode Normal Mode. The second driving voltage may be smaller than the first driving voltage ELVDD, and smaller than the minimum data voltage DATA Min in the first mode Normal Mode. In addition, the second driving voltage may have a first driving level ELVSS1 in the first mode Normal Mode.

The pixels PX may emit a light at the high luminance in the second mode HDR Mode. The reference voltage VREF may have a second reference voltage level VREF2 which is higher than the first reference voltage level VREF1. The level of the maximum grayscale voltage White Data of the second mode HDR Mode may be same as the level of the maximum grayscale voltage White Data of the first mode Normal Mode. The minimum grayscale voltage of the second mode HDR Mode may have a second minimum grayscale voltage level Black Data2 which is higher than the first minimum grayscale voltage level Black Data1. The analog power supply voltage AVDD in the second mode HDR Mode may have a second analog power supply voltage level AVDD2 which is higher than the first analog power supply voltage level AVDD1. The level of the first driving voltage ELVDD of the second mode HDR Mode may be same as the level of the first driving voltage ELVDD of the first mode Normal Mode. The level of the second driving voltage of the second mode HDR Mode may be same as the first driving level ELVSS1 of the first mode Normal Mode.

The pixels PX may emit a light at the first ultra high luminance in the third mode +HDR Mode. The reference voltage VREF may have a third reference voltage level VREF3 which is higher than the second reference voltage level VREF2. The level of the maximum grayscale voltage White Data of the third mode +HDR Mode may be same as the level of the maximum grayscale voltage White Data of the second mode HDR Mode. The minimum grayscale voltage of the third mode +HDR Mode may have a third minimum grayscale voltage level Black Data3 which is higher than the second minimum grayscale voltage level Black Data2. The analog power supply voltage AVDD may have a third analog power supply voltage level AVDD3 which is higher than the second analog power supply voltage level AVDD2 in the third mode +HDR Mode. The level of the first driving voltage ELVDD of the third mode +HDR Mode may be same as the level of the first driving voltage ELVDD of the second mode HDR Mode. In the third mode +HDR Mode, the level of the second driving voltage may be a second driving level ELVSS2 which is lower than the first driving level ELVSS1 in order for driving transistors included in the pixels PX to operate in a saturation mode.

The pixels PX may emit a light at the second ultra high luminance in the fourth mode ++HDR Mode. The reference voltage VREF may have a fourth reference voltage level VREF4 which is higher than the third reference voltage level VREF3. The level of the maximum grayscale voltage White Data of the fourth mode ++HDR Mode may be same as the level of the maximum grayscale voltage White Data of the third mode +HDR Mode. The minimum grayscale voltage of the fourth mode ++HDR Mode may have a fourth minimum grayscale voltage level Black Data4 which is higher than the third minimum grayscale voltage level Black Data3. The fourth minimum grayscale voltage level Black Data4 may be same as a level of the maximum data voltage DATA Max. The analog power supply voltage AVDD in the fourth mode ++HDR may have a fourth analog power supply voltage level AVDD4 which is higher than the third analog power supply voltage level AVDD3. The level of the first driving voltage ELVDD of the fourth mode ++HDR Mode may be same as the level of the first driving voltage ELVDD of the third mode +HDR Mode. The level of the first driving voltage ELVDD in the fourth mode ++HDR Mode may be same as the third reference voltage level VREF3. The level of the first driving voltage ELVDD may be constant and be the same as the third reference voltage level VREF3 in the first mode Normal Mode, the second mode HDR Mode, the third mode +HDR Mode and the fourth mode ++HDR Mode. In the fourth mode ++HDR Mode, the level of the second driving voltage may be a third driving level ELVSS3 which is lower than the second driving level ELVSS2 of the third mode +HDR Mode in order for the driving transistors included in the pixels PX to operate in a saturation mode. A difference A between the analog power supply voltage AVDD and the minimum grayscale voltage may be constant in the first mode Normal Mode, the second mode HDR Mode, the third mode +HDR Mode and the fourth mode ++HDR Mode. For example, the difference A between the analog power supply voltage AVDD and the minimum grayscale voltage may be constant as a minimum value in the first mode Normal Mode, the second mode HDR Mode, the third mode +HDR Mode and the fourth mode ++HDR Mode.

A difference B between the minimum grayscale voltage and the reference voltage VREF may be constant in the first mode Normal Mode, the second mode HDR Mode, the third mode +HDR Mode and the fourth mode ++HDR Mode.

A difference D1 between the first driving voltage ELVDD of the first mode Normal Mode and the second driving voltage of the first mode Normal Mode may be same as a difference D2 between the first driving voltage ELVDD of the second mode HDR Mode and the second driving voltage of the second mode HDR Mode. A difference D3 between the first driving voltage ELVDD of the third mode +HDR Mode and the second driving voltage of the third mode +HDR Mode may be larger than the difference D2 between the first driving voltage ELVDD of the second mode HDR Mode and the second driving voltage of the second mode HDR Mode. A difference D4 between the first driving voltage ELVDD of the fourth mode ++HDR Mode and the second driving voltage of the fourth mode ++HDR Mode may be larger than the difference D3 between the first driving voltage ELVDD of the third mode +HDR Mode and the second driving voltage of the third mode +HDR Mode.

The luminance of the pixels PX may increase as a difference between the maximum grayscale voltage White Data and the reference voltage VREF increases.

In the first mode Normal Mode, the pixels PX may emit a light at the luminance corresponding to a difference C1 between the reference voltage VREF of the first mode Normal Mode and the maximum grayscale voltage White Data of the first mode Normal Mode.

A difference C2 between the reference voltage VREF of the second mode HDR Mode and the maximum grayscale voltage White Data of the second mode HDR Mode may be larger than the difference C1 between the reference voltage VREF of the first mode Normal Mode and the maximum grayscale voltage White Data of the first mode Normal Mode. Accordingly, the pixels PX may emit a light at the luminance which is greater than the luminance of the first mode Normal Mode in the second mode HDR Mode.

A difference C3 between the reference voltage VREF of the third mode +HDR Mode and the maximum grayscale voltage White Data of the third mode +HDR Mode may be larger than the difference C2 between the reference voltage VREF of the second mode HDR Mode and the maximum grayscale voltage White Data of the second mode HDR Mode. Accordingly, the pixels PX may emit a light at the luminance which is greater than the luminance of the second mode HDR Mode in the third mode +HDR Mode.

A difference C4 between the reference voltage VREF of the fourth mode ++HDR Mode and the maximum grayscale voltage White Data of the fourth mode ++HDR Mode may be larger than the difference C3 between the reference voltage VREF of the third mode +HDR Mode and the maximum grayscale voltage White Data of the third mode +HDR Mode. Accordingly, the pixels PX may emit a light at the luminance which is greater than the luminance of the third mode +HDR Mode in the fourth mode ++HDR Mode.

The display device according to an embodiment of the present inventive concept maintains the maximum grayscale voltage White Data constantly constant in the first mode Normal Mode, the second mode HDR Mode, the third mode +HDR Mode and the fourth mode ++HDR Mode. The display device according to an embodiment changes the level of the reference voltage VREF, the level of the analog power supply voltage AVDD and the level of the minimum grayscale voltage. Accordingly, the pixels PX may emit a light at the ultra high luminance regardless of the first driving voltage ELVDD and/or the minimum data voltage DATA Min.

Each of the pixels PX may include the driving transistor generating a driving current. The pixels PX may emit a light at the luminance corresponding to the driving current. For example, when the driving current increases, the luminance may increase. The driving transistor may generate the driving current determined by Equation "$IDR=k\times(VREF-DATA)^2$." Herein, IDR is the driving current, k is a constant (e.g. a transconductance parameter of the driving transistor), VREF is the reference voltage and DATA is the data voltage VDATA. In an embodiment, as the maximum grayscale voltage White Data is constant, a magnitude of the driving current may increase as a magnitude of the reference voltage VREF increases. As the magnitude of the reference voltage VREF increases, a luminance of a light emitted from the pixels PX may increase. In addition, the display device may control a magnitude of the analog power supply voltage AVDD according to the driving mode, and may decrease the magnitude of the analog power supply voltage AVDD to be smaller than a magnitude of an analog power supply voltage of a conventional display device in the first mode Normal Mode and/or the second mode HDR Mode. Accordingly, a power consumption of the display device may decrease.

For example, the magnitude of the analog power supply voltage of the conventional display device may be 7.4V in the first mode Normal Mode, the second mode HDR Mode and the third mode +HDR Mode. The magnitude of the analog power supply voltage AVDD of the display device of the present inventive concept may be 4.6V in the first mode Normal Mode, 5.6V in the second mode HDR Mode, and 7.4V in the third mode +HDR Mode. Accordingly, the magnitude of the analog power supply voltage AVDD according to an embodiment is lower than that of the conventional display device in the first mode Normal Mode and the second mode HDR Mode, resulting in the reduction of the power consumption of the display device.

For example, when the conventional display device operates in a low power mode, the magnitude of the analog power supply voltage of the conventional display device may be 5.6V in the first mode Normal Mode and the second mode HDR Mode. The magnitude of the analog power supply voltage AVDD of the display device of the present inventive concept may be 4.6V in the first mode Normal Mode, 5.6V in the second mode HDR Mode. Accordingly, the magnitude of the analog power supply voltage AVDD according to an embodiment is lower than that of the conventional display device in the first mode Normal Mode, resulting in the reduction of the power consumption of the display device.

Figure 3:
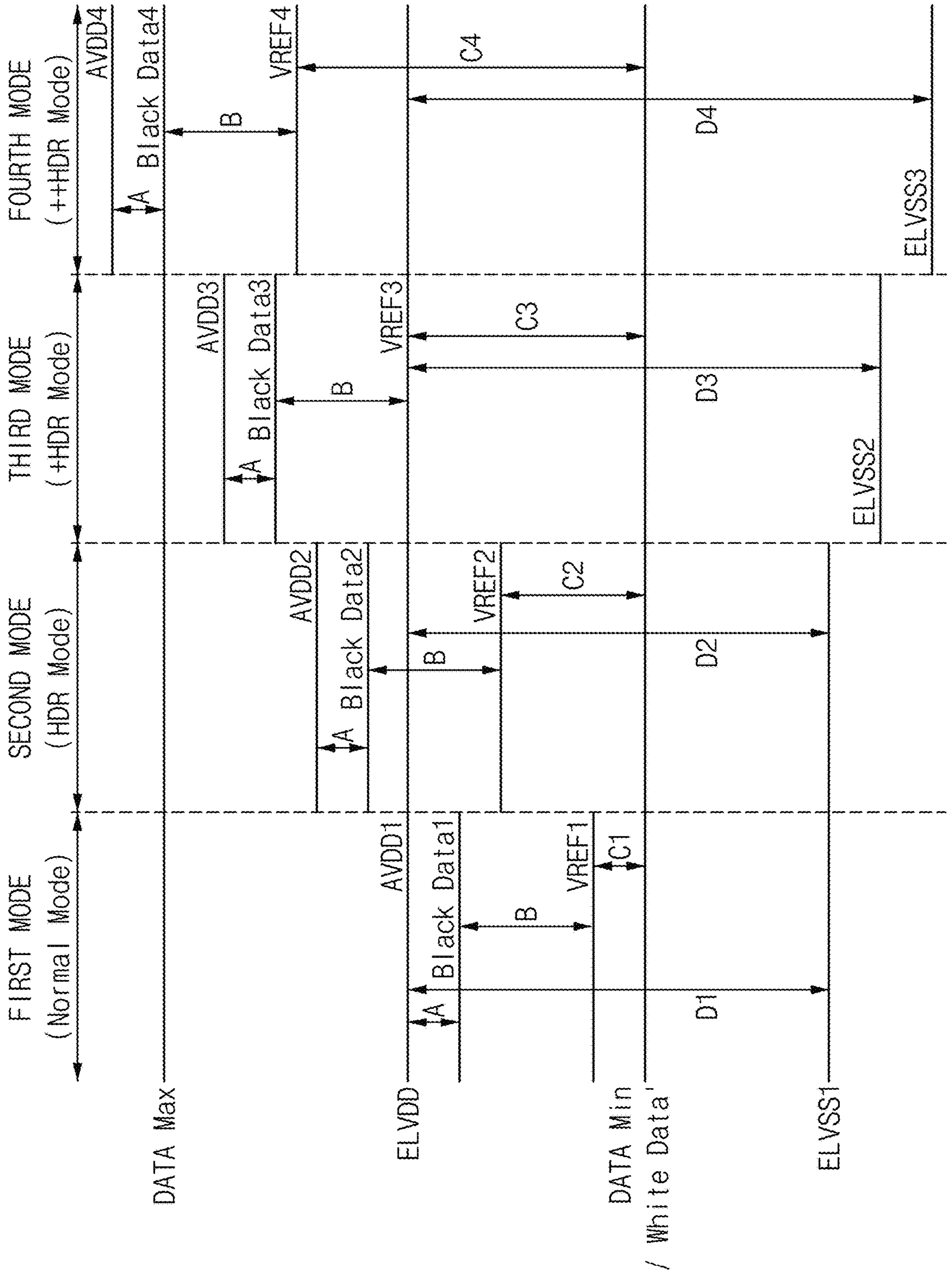
FIG. 3 is a diagram illustrating an example of voltages provided to the pixel by the panel driver of FIG. 1 according to the first mode to the fourth mode.

FIG. 3 is a diagram illustrating an example of the voltages provided to the pixel PX by the panel driver 700 of FIG. 1 according to the first mode Normal Mode, the second mode HDR Mode, the third mode +HDR Mode and the fourth mode ++HDR Mode.

The voltages of FIG. 3 provided to the pixels PX by the panel driver 700 of FIG. 1 according to the first mode Normal Mode, the second mode HDR Mode, the third mode +HDR Mode and the fourth mode ++HDR Mode are substantially the same as the voltages of FIG. 2 except for a level of the maximum grayscale voltage White Data' for the first mode Normal Mode, the second mode HDR Mode, the third mode +HDR Mode and the fourth mode ++HDR Mode. Thus, the same reference numerals will be used to refer to the same or like parts as those described in the previous embodiment of FIG. 2 and any repetitive explanation concerning the above elements will be omitted.

Referring to FIGS. 1, 2 and 3, the maximum grayscale voltage White Data' corresponding to the maximum grayscale value of the first mode Normal Mode may be the minimum data voltage DATA Min. The maximum grayscale voltage White Data' may be constant as the minimum data voltage DATA Min in the first mode Normal Mode, the second mode HDR Mode, the third mode +HDR Mode and the fourth mode ++HDR Mode.

The display device according to an embodiment of the present inventive concept maintains the maximum grayscale voltage White Data' constant in the first mode Normal Mode, the second mode HDR Mode, the third mode +HDR Mode and the fourth mode ++HDR Mode and changes the level of the reference voltage VREF, the level of the analog power supply voltage AVDD and the level of the minimum grayscale voltage. Accordingly, the pixels PX may emit a light at the ultra high luminance regardless of the first driving voltage ELVDD and/or the minimum data voltage DATA Min.

Each of the pixels PX may include the driving transistor generating the driving current. The pixels PX may emit a light at the luminance corresponding to the driving current. For example, when the driving current increases, the luminance may increase. The driving transistor may generate the driving current determined by Equation "$IDR=k\times(VREF-DATA)^2$." Herein, IDR is the driving current, k is the constant (e.g. the transconductance parameter of the driving transistor), VREF is the reference voltage and DATA is the data voltage VDATA. In an embodiment, as the maximum grayscale voltage White Data' is constant, the magnitude of the driving current may increase as the magnitude of the reference voltage VREF increases. As the magnitude of the reference voltage VREF increases, a luminance of a light emitted by the pixels PX may increase.

In addition, the display device may control the magnitude of the analog power supply voltage AVDD according to the driving mode, and may decrease the magnitude of the analog power supply voltage AVDD to be smaller than the magnitude of the analog power supply voltage of the conventional display device in the first mode Normal Mode and/or the second mode HDR Mode. Accordingly, the power consumption of the display device may decrease.

For example, the magnitude of the analog power supply voltage of the conventional display device may be 7.4V in the first mode Normal Mode, the second mode HDR Mode and the third mode +HDR Mode. The magnitude of the analog power supply voltage AVDD of the display device of the present inventive concept may be 4.6V in the first mode Normal Mode, 5.6V in the second mode HDR Mode, and 7.4V in the third mode +HDR Mode. Accordingly, as the magnitude of the analog power supply voltage AVDD according to an embodiment is lower than that of the conventional display device in the first mode Normal Mode and the second mode HDR Mode, the power consumption of the display device may be reduced.

For example, when the conventional display device operates in the low power mode, the magnitude of the analog power supply voltage of the conventional display device may be 5.6V in the first mode Normal Mode and the second mode HDR Mode. The magnitude of the analog power supply voltage AVDD of the display device of the present inventive concept may be 4.6V in the first mode Normal Mode, 5.6V in the second mode HDR Mode. Accordingly, the magnitude of the analog power supply voltage AVDD according to an embodiment is lower than that of the conventional display device in the first mode Normal Mode, and the power consumption of the display device may decrease.

Figure 4:
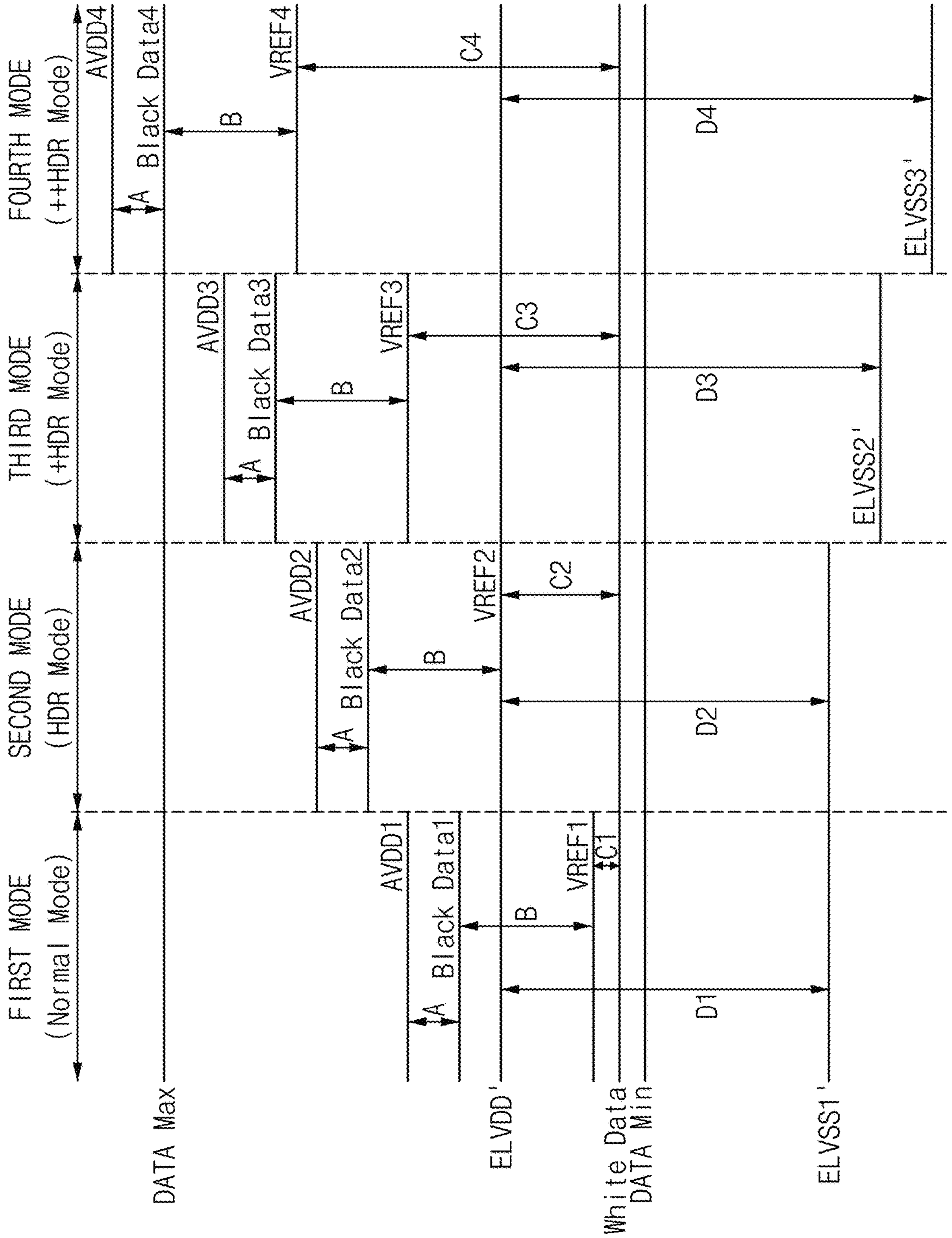
FIG. 4 is a diagram illustrating an example of voltages provided to the pixel by the panel driver of FIG. 1 according to the first mode to the fourth mode.

FIG. 4 is a diagram illustrating an example of voltages provided to the pixel PX by the panel driver 700 of FIG. 1 according to the first mode Normal Mode, the second mode HDR Mode, the third mode +HDR Mode and the fourth mode ++HDR Mode.

The voltages of FIG. 4 provided to the pixels PX by the panel driver 700 of FIG. 1 according to the first mode Normal Mode, the second mode HDR Mode, the third mode +HDR Mode and the fourth mode ++HDR Mode are substantially the same as the voltages of FIG. 2 except for a level of the first driving voltage ELVDD', and a level of the second driving voltage. Thus, the same reference numerals will be used to refer to the same or like parts as those described in the previous embodiment of FIG. 2 and any repetitive explanation concerning the above elements will be omitted.

Referring to FIGS. 1, 2 and 4, the level of the first driving voltage ELVDD' of the first mode Normal Mode may be lower than the first minimum grayscale voltage level Black Data1. The level of the first driving voltage ELVDD' of the first mode Normal Mode may be same as the second reference voltage level VREF2, which is the level of the reference voltage VREF of the second mode HDR Mode. The level of the first driving voltage ELVDD' may be constant in the first mode Normal Mode, the second mode HDR Mode, the third mode +HDR Mode and the fourth mode ++HDR Mode. The level of the first driving voltage ELVDD' may be constant and the same as the second reference voltage level VREF2 in the first mode Normal Mode, the second mode HDR Mode, the third mode +HDR Mode and the fourth mode ++HDR Mode.

The level of the second driving voltage of the first mode Normal Mode may be a first driving level ELVSS1' in order for the driving transistor included in the pixels PX to operate in the saturation mode. The first driving level ELVSS1' may be lower than the first driving level ELVSS1 of the second driving voltage of the first mode Normal Mode in FIG. 2.

The first driving level ELVSS1' of the second driving voltage of the second mode HDR Mode may be same as the first driving level ELVSS1' of the first mode Normal Mode.

The level of the second driving voltage of the third mode +HDR Mode may be a second driving level ELVSS2' which is lower than the first driving level ELVSS1' in order for the driving transistor included in the pixels PX to operate in the saturation mode.

The level of the second driving voltage of the fourth mode ++HDR Mode may be a third driving level ELVSS3' which is lower than the second driving level ELVSS2' in order for the driving transistor included in the pixels PX to operate in the saturation mode.

The display device according to an embodiment of the present inventive concept maintains the maximum grayscale voltage White Data constant in the first mode Normal Mode, the second mode HDR Mode, the third mode +HDR Mode and the fourth mode ++HDR Mode and changes the level of the reference voltage VREF, the level of the analog power supply voltage AVDD and the level of the minimum grayscale voltage. Accordingly, the pixels PX may emit a light at the ultra high luminance regardless of the first driving voltage ELVDD' and/or the minimum data voltage DATA Min.

Each of the pixels PX may include the driving transistor generating the driving current. The pixels PX may emit a light at the luminance corresponding to the driving current. For example, when the driving current increases, the luminance may increase. The driving transistor may generate the driving current determined by Equation "$IDR=k\times(VREF-DATA)^2$." Herein, IDR is the driving current, k is the constant (e.g. the transconductance parameter of the driving transistor), VREF is the reference voltage and DATA is the data voltage VDATA. In an embodiment, as the maximum grayscale voltage White Data is constant, the magnitude of the driving current may increase in proportion to the increase of the magnitude of the reference voltage VREF. As the magnitude of the reference voltage VREF increases, the luminance of a light emitted by the pixels PX may increase.

In addition, the display device may control the magnitude of the analog power supply voltage AVDD according to the driving mode, and may decrease the magnitude of the analog power supply voltage AVDD to be smaller than the magnitude of the analog power supply voltage of the conventional display device in the first mode Normal Mode and/or the second mode HDR Mode. Accordingly, the power consumption of the display device may decrease.

For example, when the conventional display device operates in the low power mode, the magnitude of the analog power supply voltage of the conventional display device may be 5.6V in the first mode Normal Mode and the second mode HDR Mode. The magnitude of the analog power supply voltage AVDD of the display device of the present inventive concept may be 4.6V in the first mode Normal Mode, 5.6V in the second mode HDR Mode. Accordingly, the magnitude of the analog power supply voltage AVDD according to an embodiment is lower than that of the conventional display device in the first mode Normal Mode, resulting in the reduction of the power consumption of the display device.

Figure 5:
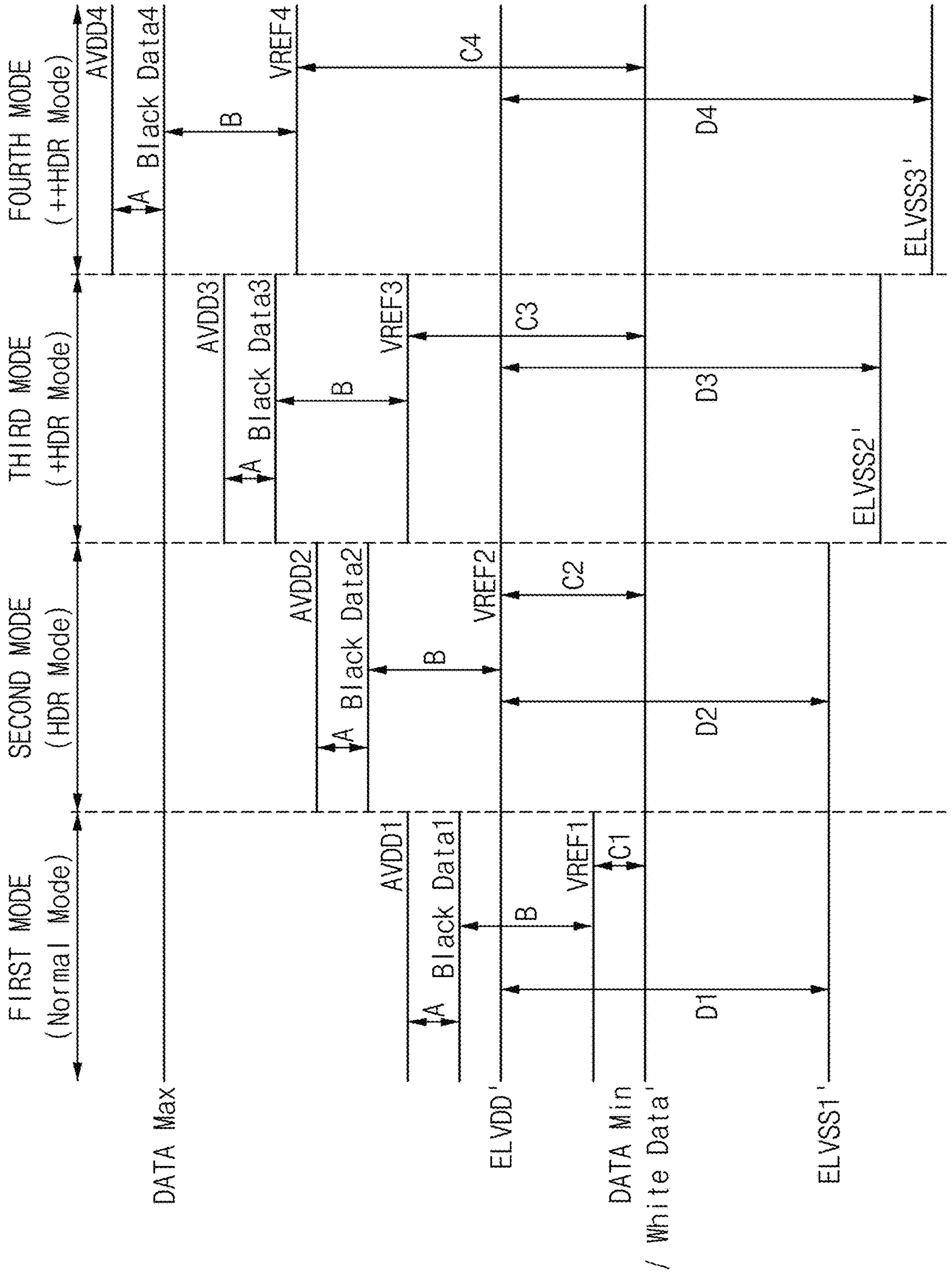
FIG. 5 is a diagram illustrating an example of voltages provided to the pixel by the panel driver of FIG. 1 according to the first mode to the fourth mode.

FIG. 5 is a diagram illustrating an example of voltages provided to the pixel PX by the panel driver 700 of FIG. 1 according to the first mode Normal Mode, the second mode HDR Mode, the third mode +HDR Mode and the fourth mode ++HDR Mode.

The voltages of FIG. 5 provided to the pixels PX by the panel driver 700 of FIG. 1 according to the first mode Normal Mode, the second mode HDR Mode, the third mode +HDR Mode and the fourth mode ++HDR Mode are substantially the same as the voltages of FIG. 4 except for a level of a maximum grayscale voltage White Data' according to the first mode Normal Mode, the second mode HDR Mode, the third mode +HDR Mode and the fourth mode ++HDR Mode. Thus, the same reference numerals will be used to refer to the same or like parts as those described in the previous embodiment of FIG. 4 and any repetitive explanation concerning the above elements will be omitted.

Referring to FIGS. 1, 2, 4 and 5, the maximum grayscale voltage White Data' corresponding to the maximum grayscale value of the first mode Normal Mode may be the minimum data voltage DATA Min. The maximum grayscale voltage White Data' may be constant and the same as the minimum data voltage DATA Min in the first mode Normal Mode, the second mode HDR Mode, the third mode +HDR Mode and the fourth mode ++HDR Mode.

The display device according to an embodiment of the present inventive concept maintains the maximum grayscale voltage White Data' constant in the first mode Normal Mode, the second mode HDR Mode, the third mode +HDR Mode and the fourth mode ++HDR Mode and changes the level of the reference voltage VREF, the level of the analog power supply voltage AVDD and the level of the minimum grayscale voltage. Accordingly, the pixels PX may emit a light at the ultra high luminance regardless of the first driving voltage ELVDD' and/or the minimum data voltage DATA Min.

Each of the pixels PX may include the driving transistor generating the driving current. The pixels PX may emit a light at the luminance corresponding to the driving current. For example, when the driving current increases, the luminance may increase. The driving transistor may generate the driving current determined by Equation "$IDR=k\times(VREF-DATA)^2$." Herein, IDR is the driving current, k is the constant (e.g. the transconductance parameter of the driving transistor), VREF is the reference voltage and DATA is the data voltage VDATA. In an embodiment, as the maximum grayscale voltage White Data' is constant, the magnitude of the driving current may increase in proportion to the increase of the magnitude of the reference voltage VREF. As the magnitude of the reference voltage VREF increases, the luminance of a light emitted by the pixels PX may increase.

In addition, the display device may control the magnitude of the analog power supply voltage AVDD according to the driving mode, and may decrease the magnitude of the analog power supply voltage AVDD to be smaller than the magnitude of the analog power supply voltage of the conventional display device in the first mode Normal Mode and/or the second mode HDR Mode. Accordingly, the power consumption of the display device may decrease.

For example, when the conventional display device operates in the low power mode, the magnitude of the analog power supply voltage of the conventional display device may be 5.6V in the first mode Normal Mode and the second mode HDR Mode. The magnitude of the analog power supply voltage AVDD of the display device of the present inventive concept may be 4.6V in the first mode Normal Mode, 5.6V in the second mode HDR Mode. Accordingly, the magnitude of the analog power supply voltage AVDD according to an embodiment is lower than that of the conventional display device in the first mode Normal Mode, and the power consumption of the display device may decrease.

Figure 6:
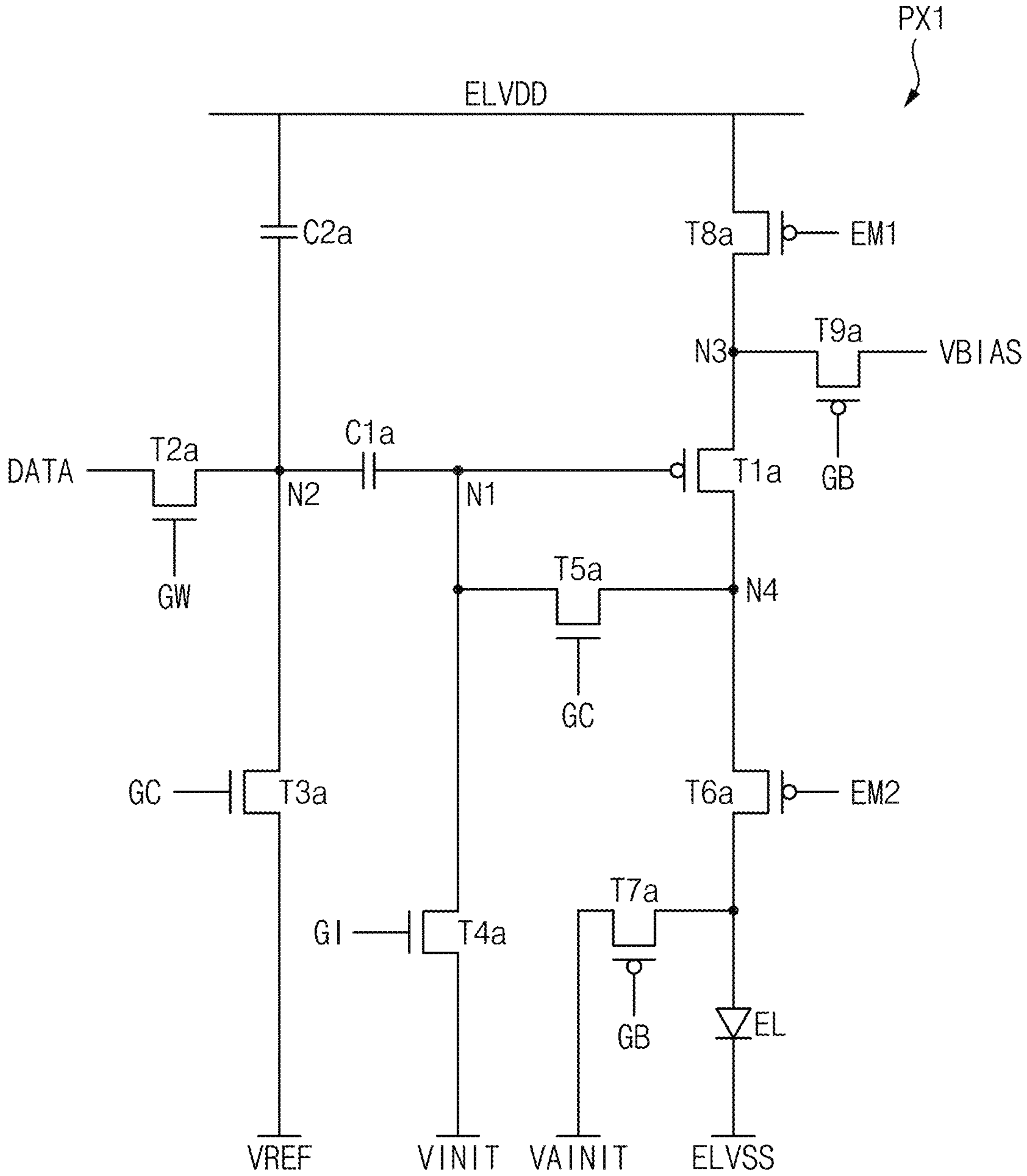
FIG. 6 is a circuit diagram illustrating an example of the pixel included in a display panel of FIG. 1.

FIG. 6 is a circuit diagram illustrating an example of a pixel PX1 included in the display panel 100 of FIG. 1.

Referring to FIGS. 1 and 6, the pixel PX1 may include a first capacitor C1*a*, a second capacitor C2*a*, a first transistor T1*a*, a second transistor T2*a*, a third transistor T3*a*, a fourth transistor T4*a*, a fifth transistor T5*a*, a sixth transistor T6*a*, a seventh transistor T7*a*, an eighth transistor T8*a*, a ninth transistor T9*a* and a light emitting element EL.

The first capacitor C1*a* may be connected to between a first node N1 and a second node N2, and store a data voltage DATA. In an embodiment, the first capacitor C1*a* may include a first electrode connected to the second node N2 and a second electrode connected to the first node N1.

The second capacitor C2*a* may maintain a voltage of the second node N2. In an embodiment, the second capacitor C2*a* may include a first electrode receiving the first driving voltage ELVDD and a second electrode connected to the second node N2.

The first transistor T1*a* may generate the driving current. The first transistor T1*a* may be referred to as the driving transistor generating the driving current. In an embodiment, the first transistor T1*a* may include a control electrode connected to the first node N1, a first electrode connected to a third node N3 and a second electrode connected to a fourth node N4.

The second transistor T2*a* may transmit the data voltage DATA to the second node N2 in response to the writing signal GW. In an embodiment, the second transistor T2*a* may include a control electrode receiving the writing signal GW, a first electrode receiving the data voltage DATA and a second electrode connected to the second node N2.

The third transistor T3*a* may transmit the reference voltage VREF to the second node N2 in response to the compensation signal GC. In an embodiment, the third transistor T3*a* may include a control electrode receiving the compensation signal GC, a first electrode connected to the second node N2 and a second electrode receiving the reference voltage VREF.

The fourth transistor T4*a* may transmit the initialization voltage VINT to the first node N1 in response to the initialization signal GI. In an embodiment, the fourth transistor T4*a* may include a control electrode receiving the initialization signal GI, a first electrode connected to the first node N1 and a second electrode receiving the initialization voltage VINT.

The fifth transistor T5*a* may diode-connect the first node N1 and the fourth node N4 in response to the compensation signal GC. In an embodiment, the fifth transistor T5*a* may include a control electrode receiving the compensation signal GC, a first electrode connected to the first node N1 and a second electrode connected to the fourth node N4.

The sixth transistor Toa may cause the light emitting element EL to emit a light in response to the second emission signal EM2. In an embodiment, the sixth transistor T6*a* may include a control electrode receiving the second emission signal EM2, a first electrode connected to the fourth node N4 and a second electrode connected to an anode electrode of the light emitting element EL.

The seventh transistor T7*a* may transmit the anode initialization voltage VAINIT to the anode electrode of the light emitting element EL in response to the bypass signal GB. In an embodiment, the seventh transistor T7*a* may include a control electrode receiving the bypass signal GB, a first electrode receiving the anode initialization voltage VAINIT and a second electrode connected to the anode electrode of the light emitting element EL.

The eighth transistor T8*a* may cause the light emitting element EL to emit a light in response to the first emission signal EM1. In an embodiment, the eighth transistor T8*a* may include a control electrode receiving the first emission signal EM1, a first electrode receiving the first driving voltage ELVDD and a second electrode connected to the third node N3.

The ninth transistor T9*a* may transmit a bypass voltage VBIAS to the third node N3 in response to the bypass signal GB. In an embodiment, the ninth transistor T9*a* may include a control electrode receiving the bypass signal GB, a first electrode connected to the third node N3 and a second electrode receiving the bypass voltage VBIAS.

The light emitting element EL may emit a light based on the driving current generated by the first transistor T1*a*. In an embodiment, the light emitting element EL may be an organic light emitting diode (OLED). In an embodiment, the light emitting element EL may be a quantum dot (QD) light emitting diode, a micro light emitting diode, an inorganic light emitting diode, or any other suitable light emitting element. In an embodiment, the light emitting element EL may include the anode electrode connected to the second electrode of the seventh transistor T7*a* and a cathode electrode receiving the second driving voltage ELVSS.

The first transistor T1*a*, the sixth transistor T6*a*, the seventh transistor T7*a*, the eighth transistor T8*a* and the ninth transistor T9*a* may be a P-type transistor. The second transistor T2*a*, the third transistor T3*a*, the fourth transistor T4*a* and the fifth transistor T5*a* may be an N-type transistor. For example, The P-type transistor may be a P-type metal oxide semiconductor (PMOS) transistor. For example, The N-type transistor may be an N-type metal oxide semiconductor (NMOS) transistor. The present inventive concept is not limited thereto.

The first transistor T1*a* may generate the driving current determined by Equation "$IDR=k\times(VREF-DATA)^2$." Herein, IDR is the driving current, k is the constant (e.g. the transconductance parameter of the first transistor T1*a*), VREF is the reference voltage and DATA is the data voltage.

The light emitting element EL may emit a light at the luminance corresponding the driving current generated by the first transistor T1*a*. The light emitting element EL may emit a light at the higher luminance as the reference voltage VREF increases. In addition, even if the magnitude of the first driving voltage ELVDD changes, the driving current is not affected. As long as the reference voltage VREF remains constant, the light emitting element EL may emit a light at a same luminance even if the magnitude of the first driving voltage ELVDD is reduced.

In addition, if a magnitude of the data voltage DATA and/or the magnitude of the reference voltage VREF increase beyond a certain level, the second driving voltage ELVSS may be adjusted to a lower voltage in order for the first transistor T1*a* to operate in the saturation mode.

Although the pixel PX1 in FIG. 6 includes nine transistors T1*a* to T9*a* and two capacitors C1*a* and C2*a*, the present inventive concept is not limited thereto. For example, the pixel PX1 may include at least two or more pixel switching elements or at least one or more capacitors.

Figure 7:
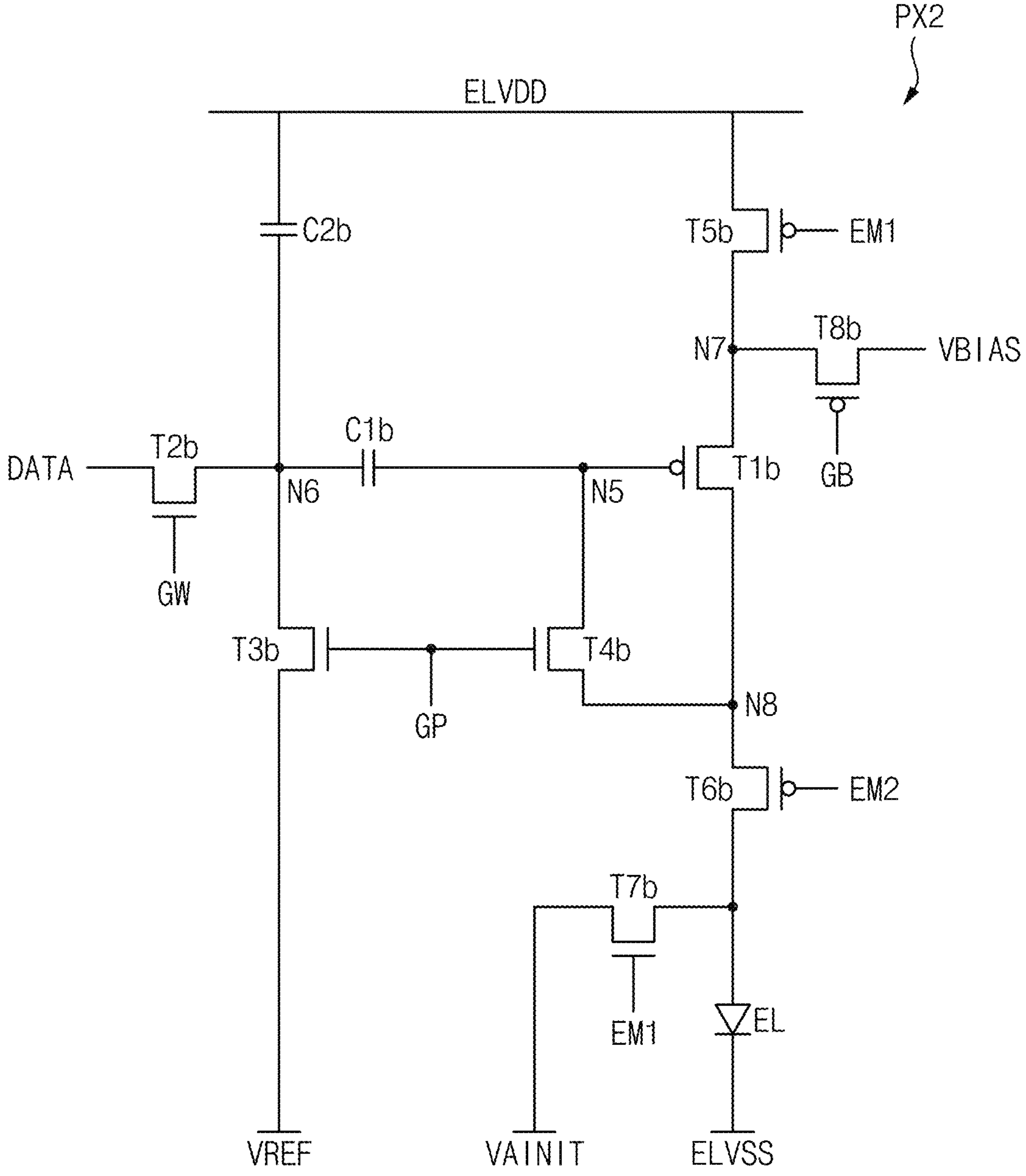
FIG. 7 is a circuit diagram illustrating an example of the pixel included in a display panel of FIG. 1.

FIG. 7 is a circuit diagram illustrating an example of the pixel PX2 included in a display panel 100 of FIG. 1.

Referring to FIGS. 1 and 7, the pixel PX2 may include a first capacitor C1*b*, a second capacitor C2*b*, a first transistor T1*b*, a second transistor T2*b*, a third transistor T3*b*, a fourth transistor T4*b*, a fifth transistor T5*b*, a sixth transistor T6*b*, a seventh transistor T7*b*, an eighth transistor T8*b* and a light emitting element EL.

The first capacitor C1*b* may be connected to between a fifth node N5 and a sixth node N6, and store the data voltage DATA. In an embodiment, the first capacitor C1*b* may include a first electrode connected to the sixth node N6 and a second electrode connected to the fifth node N5.

The second capacitor C2*b* may maintain a voltage of the sixth node N6. In an embodiment, the second capacitor C2*b* may include a first electrode receiving the first driving voltage ELVDD and a second electrode connected to the sixth node N6.

The first transistor T1*b* may generate the driving current. The first transistor T1*b* may be referred to as the driving transistor generating the driving current. In an embodiment, the first transistor T1*b* may include a control electrode connected to the fifth node N5, a first electrode connected to a seventh node N7 and a second electrode connected to an eighth node N8.

The second transistor T2*b* may transmit the data voltage DATA to the sixth node N6 in response to the writing signal GW. In an embodiment, the second transistor T2*b* may include a control electrode receiving the writing signal GW, a first electrode receiving the data voltage DATA and a second electrode connected to the sixth node N6.

The third transistor T3*b* may transmit the reference voltage VREF to the sixth node N6 in response to the compensation initialization signal GP. In an embodiment, the third transistor T3*b* may include a control electrode receiving the compensation initialization signal GP, a first electrode connected to the sixth node N6 and a second electrode receiving the reference voltage VREF.

The fourth transistor T4*b* may diode-connect the fifth node N5 and the eighth node N8 in response to the compensation initialization signal GP. In an embodiment, the fourth transistor T4*b* may include a control electrode receiving the compensation initialization signal GP, a first electrode connected to the fifth node N5 and a second electrode connected to the eighth node N8.

The fifth transistor T5*b* may cause the light emitting element EL to emit a light in response to the first emission signal EM1. In an embodiment, the fifth transistor T5*b* may include a control electrode receiving the first emission signal EM1, a first electrode receiving the first driving voltage ELVDD and a second electrode connected to the seventh node N7.

The sixth transistor T6*b* may cause the light emitting element EL to emit a light in response to the second emission signal EM2. In an embodiment, the sixth transistor T6*b* may include a control electrode receiving the second emission signal EM2, a first electrode connected to the eighth node N8 and a second electrode connected to the anode electrode of the light emitting element EL.

The seventh transistor T7*b* may transmit an anode initialization voltage VAINIT to the anode electrode of the light emitting element EL in response to the first emission signal EM1. In an embodiment, the seventh transistor T7*b* may include a control electrode receiving the first emission signal EM1, a first electrode receiving the anode initialization voltage VAINIT and a second electrode connected to the anode electrode of the light emitting element EL.

The eighth transistor T8*b* may transmit the bypass voltage VBIAS to the seventh node N7 in response to the bypass signal GB. In an embodiment, the eighth transistor T8*b* may include a control electrode receiving the bypass signal GB, a first electrode connected to the seventh node N7 and a second electrode receiving the bypass voltage VBIAS.

The light emitting element EL may emit a light based on the driving current generated by the first transistor T1*b*. In an embodiment, the light emitting element EL may be an organic light emitting diode (OLED). In an embodiment, the light emitting element EL may be a quantum dot (QD) light emitting diode, a micro light emitting diode, an inorganic light emitting diode, or any other suitable light emitting element. In an embodiment, the light emitting element EL may include the anode electrode connected to the second electrode of the seventh transistor T7*b* and a cathode electrode receiving the second driving voltage ELVSS.

The first transistor T1*b*, the fifth transistor T5*b*, the sixth transistor T6*b* and the eighth transistor T8*a* may be a P-type transistor. The second transistor T2*b*, the third transistor T3*b*, the fourth transistor T4*b* and the seventh transistor T7*b* may be an N-type transistor. For example, The P-type transistor may be a P-type metal oxide semiconductor (PMOS) transistor. For example, The N-type transistor may be an N-type metal oxide semiconductor (NMOS) transistor. The present inventive concept is not limited thereto.

The first transistor T1*b* may generate the driving current determined by Equation "$IDR=k\times(VREF-DATA)^2$." Herein, IDR is the driving current, k is the constant (e.g. the transconductance parameter of the first transistor T1*b*), VREF is the reference voltage and DATA is the data voltage.

The light emitting element EL may emit a light at the luminance corresponding the driving current generated by the first transistor T1*b*. The light emitting element EL may emit a light at the higher luminance as the reference voltage VREF increases. In addition, even if the magnitude of the first driving voltage ELVDD changes, the driving current is not affected. As long as the reference voltage VREF remains constant, the light emitting element EL may emit a light at a same luminance even if the magnitude of the first driving voltage ELVDD is reduced.

In addition, if a magnitude of the data voltage DATA and/or the magnitude of the reference voltage VREF increase beyond a certain level, the second driving voltage ELVSS may be adjusted to a lower voltage in order for the first transistor T1*b* to operate in the saturation mode.

Although the pixel PX2 in FIG. 7 includes eight transistors T1*b* to T8*b* and two capacitors C1*b* and C2*b*, but the present inventive concept is not limited thereto. For example, the pixel PX2 may include at least two or more pixel switching elements or at least one or more capacitors.

Figure 8:
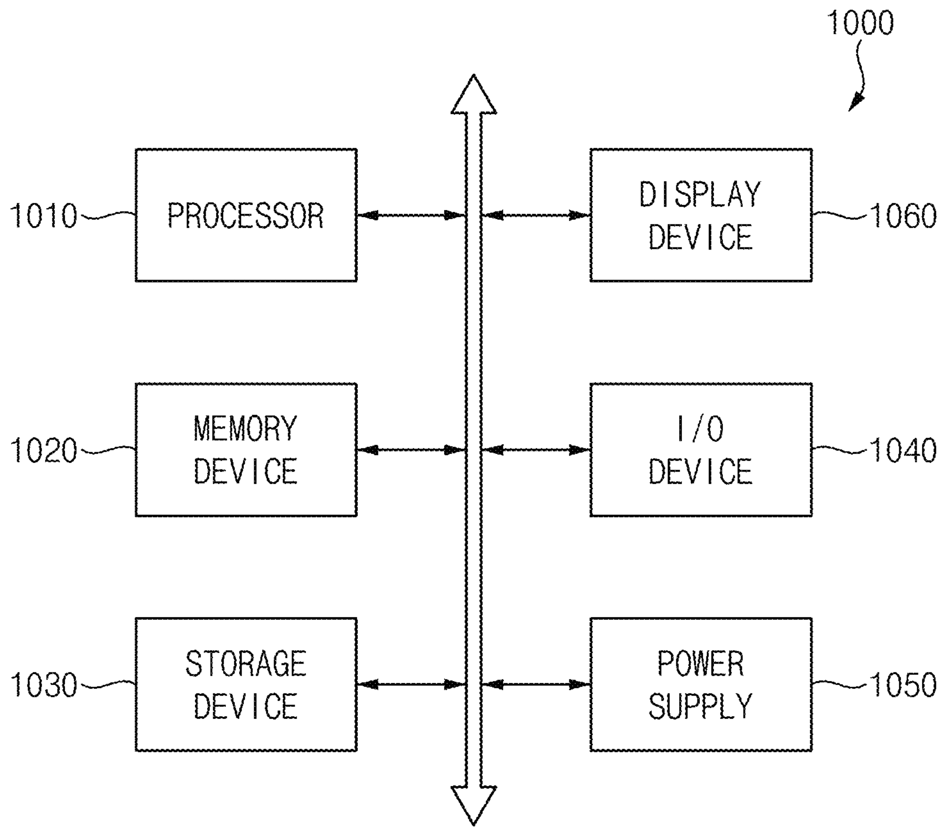
FIG. 8 is a block diagram illustrating an electronic device including the display device according to an embodiment of the present inventive concept.
Figure 9:
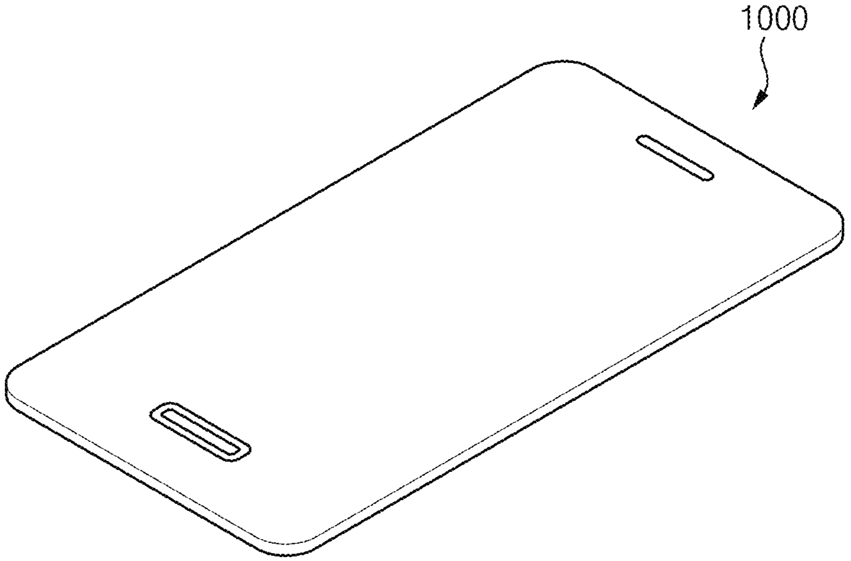
FIG. 9 is a diagram illustrating an example in which the electronic device of FIG. 8 is implemented as a smart phone.

FIG. 8 is a block diagram illustrating an electronic device 1000 including the display device according to an embodiment of the present inventive concept. FIG. 9 is a diagram illustrating an example in which the electronic device 1000 of FIG. 8 is implemented as a smart phone.

Referring to FIGS. 8 and 9, the electronic device 1000 may include a processor 1010, a memory device 1020, a storage device 1030, an input/output (I/O) device 1040, a power supply 1050, and a display device 1060. The display device 1060 may be the display device illustrated in FIG. 1. In addition, the electronic device 1000 may further include ports for communicating with a video card, a sound card, a memory card, an universal serial bus (USB) device, other electronic device, or the like.

In an embodiment, as illustrated in FIG. 9, the electronic device 1000 may be implemented as the smart phone. However, the electronic device 1000 of the present disclosure is not limited thereto. For example, the electronic device 1000 may be implemented as a cellular phone, a video phone, a smart pad, a smart watch, a tablet PC, a car navigation system, a computer monitor, a laptop, a head mounted display (HMD) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, or the like, and an output device such as a printer, a speaker, or the like. The I/O device 1040 may include the display device 1060 having a touch panel placed on the display device 1060.

The power supply 1050 may provide power for operations of the electronic device 1000.

The display device 1060 may be connected to other components through buses or other communication links.

The driving mode of the display device 1060 may include a first mode, a second mode, a third mode and a fourth mode. A luminance may increase in an order of the first mode, the second mode, the third mode and the fourth mode. For example, the luminance of the display device 1060 in the first mode may be a lowest luminance, and the luminance of display device 1060 in the fourth mode may be a highest luminance. Each of pixels may emit a light at the luminance corresponding to a difference between a reference voltage and a data voltage. For example, each of the pixels may emit a light at the luminance proportional to a square of the difference between the reference voltage and the data voltage. The pixels PX in the display device 1060 may emit a light at an ultra high luminance regardless of a first driving voltage and/or a minimum data voltage by maintaining a maximum grayscale voltage corresponding to a maximum grayscale value of each mode constant in the first mode, the second mode, the third mode and the fourth mode, and by changing a level of the reference voltage, a level of an analog power supply voltage and a level of a minimum grayscale voltage.

In addition, the display device 1060 may control a magnitude of the analog power supply voltage according to the driving mode, and may decrease the magnitude of the analog power supply voltage to be smaller than a magnitude of an analog power supply voltage of a conventional display device in the first mode Normal Mode. Accordingly, the power consumption of the display device 1060 may decrease.

According to embodiments, the electronic device 1000 may be any electronic device including the display device 1060, such as a smart phone, a mobile phone, a tablet computer, a digital TV, a 3D TV, a personal computer (PC), a home electronic device, a laptop computer, a personal digital assistant (PDA), a portable multimedia player (PMP), a digital camera, a music player, a portable game console, a navigation, or the like.

Figure 10:
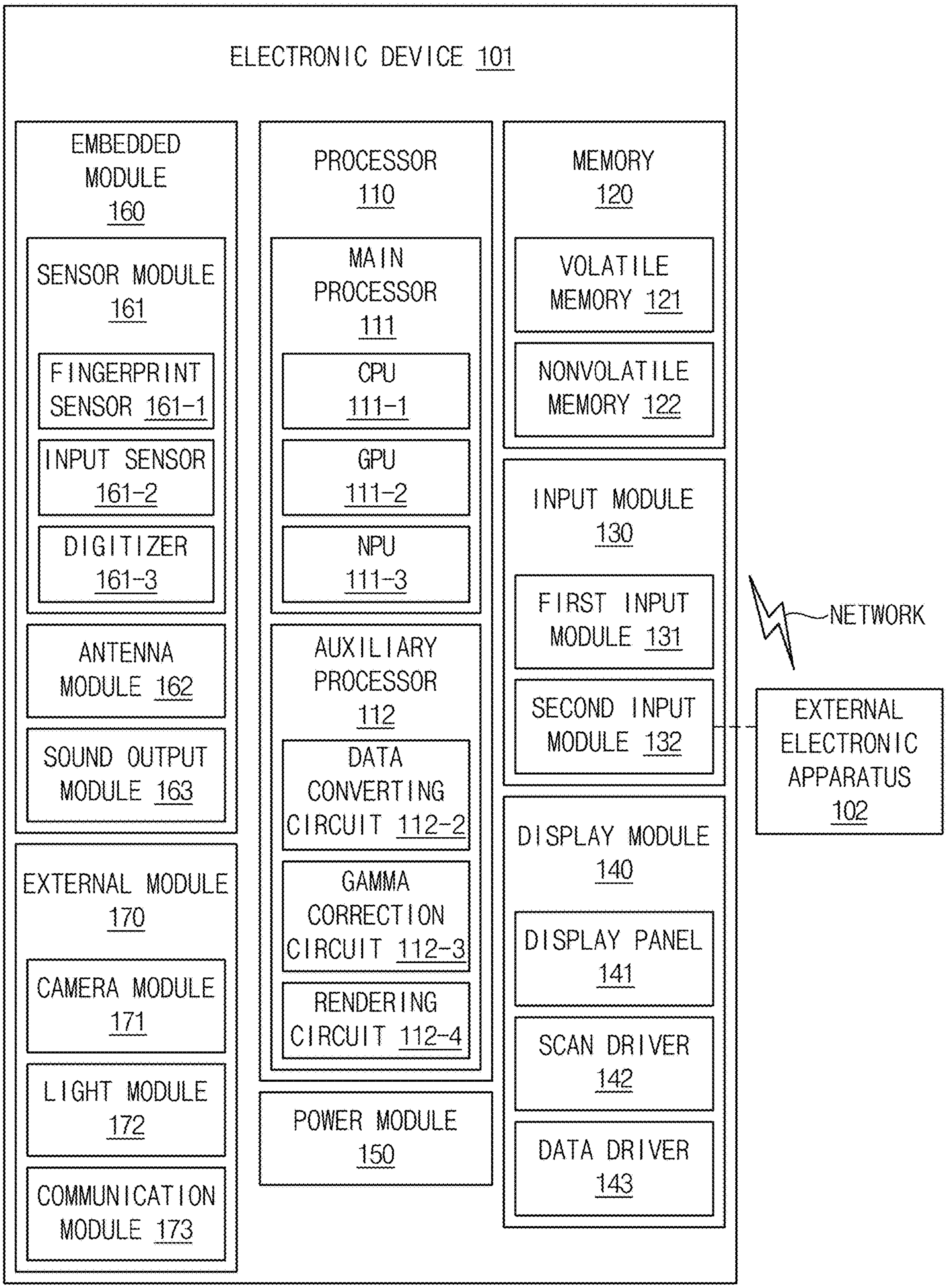
FIG. 10 is a block diagram illustrating the electronic device according to an embodiment of the present inventive concept.

FIG. 10 is a block diagram illustrating the electronic device 101 according to an embodiment of the present inventive concept.

Referring to FIGS. 1 to 10, an electronic device 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains the fingerprint information of the user as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input through the music streaming application, the processor 110 activates a sound output module 163 to provide sound information corresponding to the music execution command to the user.

In the above, the operation of the electronic device 101 is briefly described. Hereinafter, a configuration of the electronic device 101 is described in detail. Some of elements of the electronic device 101 described later may be integrated and provided as one element, or one element may be separated as two or more elements.

The electronic device 101 may communicate with an external electronic device 102 through a network (e.g. a short-range wireless communication network or a long-range wireless communication network). According to an embodiment, the electronic device 101 may include the processor 110, the memory 120, the input module 130, the display module 140, a power module 150, an embedded module 160, and an external module 170. According to an embodiment, in the electronic device 101, at least one of the above-described elements may be omitted or one or more other device may be added. According to an embodiment, some of the above-described elements (e.g., the sensor module 161, an antenna module 162 or the sound output module 163) may be integrated into another element (e.g. the display module 140).

The processor 110 may execute software to control at least one other element (e.g. hardware or software element) of the electronic device 101 connected to the processor 110 and to perform various data processing or operations. According to an embodiment, as at least part of the data processing or the operations, the processor 110 may store the received instructions or data from other elements (e.g. the input module 130, the sensor module 161 or a communication module 173) in a volatile memory 121, may process the instructions or data stored in the volatile memory 121, and may store the result of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN) and a deep Q-networks or a combination of two or more of the above. However, the artificial neural network of the present disclosure is not limited to the above examples. The artificial intelligence model may include software structures, in addition to hardware structures or instead of the hardware structures. At least two of the above-described processing units and the above-described processors may be implemented as an integrated element (e.g. a single chip) or each may be implemented as independent elements (e.g. in a plurality of chips).

The main processor 111 may output an image signal to the auxiliary processor 112. For example, the main processor 111 may output an input image data and an input control signal to the auxiliary processor 112.

The auxiliary processor 112 may include a controller. The controller may include an interface conversion circuit and a timing control circuit. The controller receives the image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic device 101 or a user setting or may convert the image data to reduce a power consumption or compensate for afterimages. The gamma correction circuit 112-3 may convert the image data or a gamma reference voltage such that the image displayed on the electronic device 101 has desired gamma characteristics. The rendering circuit 112-4 may receive the image data from the controller and may render the image data based on a pixel arrangement of the display panel 141 included in the electronic device 101. At least one of the data converting circuit 112-2, the gamma correction circuit 112-3 and the rendering circuit 112-4 may be integrated into another element (e.g. the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g. the processor 110 or the sensor module 161) of the electronic device 101, as well as input or output data related to corresponding commands. The memory 120 may include at least one of the volatile memory 121 and the nonvolatile memory 122.

The input module 130 may receive commands or data, which is used in the elements (e.g. the processor 110, the sensor module 161 or the sound output module 163) of the electronic device 101, from the outside of the electronic device 101 (e.g. the user or the external electronic device 102).

The input module 130 may include a first input module 131 for receiving commands or data from the user and a second input module 132 for receiving commands or data from the external electronic device 102. The first input module 131 may include a microphone, a mouse, a keyboard, a key (e.g. a button) or a pen (e.g. a passive pen or an active pen). The second input module 132 may support a designated protocol capable of connecting to the external electronic device 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic device 102, for example, an HDMI connector, a USB connector, an SD card connector, or an audio connector (e.g. a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. However, the type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. However, the present disclosure is not limited thereto. For example, the scan driver 142 may be integrated on the display panel 141. For example, the scan driver 142 may include an amorphous silicon TFT gate driver circuit (ASG) integrated on the display panel 141, a low temperature polycrystalline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. However, the present disclosure is not limited thereto. For example, the light emission driver and the scan driver 142 may be integrally formed.

The data driver 143 receives a control signal from the controller and converts the image data into an analog voltage (e.g. the data voltage) and output the data voltages to the display panel 141 in response to the control signal.

The data driver 143 may be integrated into another element (e.g. the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic device 101. The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic device 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure biosignals such as blood pressure, moisture, or body fat. For example, when a user touches a part of his body to a sensor layer or a sensing panel and does not move for a certain period of time, the input sensor 161-2 may detect the biosignal based on a change in an electric field caused by the part of the body so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present inventive concept may not be limited to a position of the sensing panel as described above.

At least one of the fingerprint sensor 161-1, the input sensor 161-2 and the digitizer 161-3 may be embedded in the display panel 141. For example, at least one of the fingerprint sensor 161-1, the input sensor 161-2 and the digitizer 161-3 is formed simultaneously with the display panel 141 through a process of forming elements included in the display panel 141 (e.g. light emitting elements, transistors, etc.).

In addition, the sensor module 161 may generate an electrical signal or a data value corresponding to an internal state or an external state of the electronic device 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic device or receive a signal from an external electronic device through an antenna suitable for a communication method. An antenna pattern of the antenna module 162 may be integrated with an element of the display module 140 (e.g. the display panel 141) or the input sensor 161-2.

The sound output module 163 is a device for outputting sound signals to the outside of the electronic device 101. For example, the sound output module 163 may include a speaker used for general purposes such as playing multimedia or recording and a receiver used for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide light. The light module 172 may include a light emitting diode or a xenon lamp. The light module 172 may operate in conjunction with the camera module 171 or operate independently.

The communication module 173 may support establishment of a wired or wireless communication channel between the electronic device 101 and the external electronic device 102 and communication through the established communication channel. The communication module 173 may include one or both of a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic device 102 through a short-range communication network such as Bluetooth, WiFi direct or infrared data association (IrDA) or a long-distance communication network such as a cellular network, the Internet, or a computer network (e.g. LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140. In addition, the processor 110 may generate command data corresponding to the input data and output the generated command data to the camera module 171 or the light module 172. When input data is not received from the input module 130 for a certain period of time, the processor 110 converts an operation mode of the electronic device 101 into a low power mode or a sleep mode to reduce the power consumption of the electronic device 101.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the input data sensed by the input sensor 161-2 or the digitizer 161-3. When the sensor module 161 includes a temperature sensor, the processor 110 may receive temperature data corresponding to the temperature measured from the sensor module 161 and may further perform luminance correction on the image data based on the temperature data.

The processor 110 may receive the determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 on the display module 140.

Some of the above elements may be connected to each other through a communication method between peripheral devices such as a bus, a general purpose input/output (GPIO), a serial peripheral interface (SPI), a mobile industry processor interface (MIPI), or a ultra path interconnect (UPI) link to exchange signals (e.g. commands or data) with each other. The processor 110 may communicate with the display module 140 through an agreed interface. For example, the processor 110 may communicate with the display module 140 through any one of the above communication methods. However, the communication methods according to the present disclosure may not be limited to the examples described above.

The electronic device 101 according to various embodiments disclosed in the disclosure may be various types of devices. For example, the electronic device 101 may include at least one of a portable communication device (e.g. a smart phone), a computer device, a portable multimedia device, a portable medical device, a camera, a wearable device or a home appliance. However, the electronic device 101 according to the embodiment of the disclosure may not be limited to the aforementioned exemplified devices.

For example, the display panel 100 of FIG. 1 may correspond to the display panel 141 of FIG. 10. For example, the controller 200 of FIG. 1 may correspond to the controller of the auxiliary processor 112 of FIG. 10. For example, the scan driver 300 of FIG. 1 may correspond to the scan driver 142 of FIG. 10. For example, the data driver 600 of FIG. 1 may correspond to the data driver 143 of FIG. 10.

The inventive concepts may be applied to any display device and any electronic device. For example, the inventive concepts may be applied to a mobile phone, a smart phone, a tablet computer, a television (TV), a digital TV, a 3D TV, a personal computer (PC), a household electronic device, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device comprising:

a display panel including a pixel; and a panel driver configured to provide a reference voltage and a data voltage to the pixel, wherein the pixel is configured to emit a light at a luminance corresponding to a difference between the reference voltage and the data voltage, wherein the panel driver includes a power management circuit configured to generate an analog power supply voltage, and to provide the analog power supply voltage to a data driver, wherein a driving mode of the display device includes a first mode in which the pixel is configured to emit a light at a first luminance for a first grayscale value, and a second mode in which the pixel is configured to emit a light at a second luminance higher than the first luminance of the first mode for the first grayscale value, wherein the analog power supply voltage in the first mode has a first analog power supply voltage level, and wherein the analog power supply voltage in the second mode has a second analog power supply voltage level higher than the first analog power supply voltage level.

2. The display device of claim 1, wherein the reference voltage in the first mode has a first reference voltage level lower than the first analog power supply voltage level, and wherein the reference voltage in the second mode has a second reference voltage level higher than the first reference voltage level.

3. The display device of claim 2, wherein the data voltage corresponding to a minimum grayscale value is a minimum grayscale voltage, wherein the minimum grayscale voltage in the first mode has a first minimum grayscale voltage level lower than the first analog power supply voltage level and higher than the first reference voltage level, and wherein the minimum grayscale voltage in the second mode has a second minimum grayscale voltage level higher than the first minimum grayscale voltage level.

4. The display device of claim 3, wherein a difference between the analog power supply voltage and the minimum grayscale voltage is constant in the first mode and the second mode and a difference between the minimum grayscale voltage and the reference voltage is constant in the first mode and the second mode.

5. The display device of claim 3, wherein the driving mode of the display device further includes a third mode in which the pixel is configured to emit a light at a third luminance higher than the second luminance of the second mode for the first grayscale value, and a fourth mode in which the pixel is configured to emit a light at a fourth luminance higher than the third luminance of the third mode for the first grayscale value, wherein the analog power supply voltage in the third mode has a third analog power supply voltage level higher than the second analog power supply voltage level, and wherein the analog power supply voltage in the fourth mode has a fourth analog power supply voltage level higher than the third analog power supply voltage level.

6. The display device of claim 5, wherein the reference voltage in the third mode has a third reference voltage level higher than the second reference voltage level, and wherein the reference voltage in the fourth mode has a fourth reference voltage level higher than the third reference voltage level.

7. The display device of claim 6, wherein the minimum grayscale voltage in the third mode has a third minimum grayscale voltage level higher than the second minimum grayscale voltage level, and wherein the minimum grayscale voltage in the fourth mode has a fourth minimum grayscale voltage level higher than the third minimum grayscale voltage level.

8. The display device of claim 7, wherein a maximum voltage of a maximum output range of the data voltage provided to the pixel by the panel driver is a maximum data voltage, and wherein the fourth minimum grayscale voltage level is equal to a level of the maximum data voltage.

9. The display device of claim 7, wherein a difference between the analog power supply voltage and the minimum grayscale voltage is constant in the first mode, the second mode, the third mode and the fourth mode and a difference between the minimum grayscale voltage and the reference voltage is constant in the first mode, the second mode, the third mode and the fourth mode.

10. The display device of claim 7, wherein the data voltage corresponding to a maximum grayscale value is a maximum grayscale voltage, wherein a level of the maximum grayscale voltage is constant in the first mode, the second mode, the third mode and the fourth mode, and wherein the level of the maximum grayscale voltage is lower than the first reference voltage level.

11. The display device of claim 10, wherein a minimum voltage of a maximum output range of the data voltage provided to the pixel by the panel driver is a minimum data voltage, and wherein the maximum grayscale voltage is equal to the minimum data voltage.

12. The display device of claim 7, wherein a first driving voltage to drive the pixel is applied to the pixel, and wherein the first driving voltage is constant in the first mode, the second mode, the third mode and the fourth mode.

13. The display device of claim 12, wherein the first driving voltage has the third reference voltage level.

14. The display device of claim 12, wherein the first driving voltage has the second reference voltage level.

15. The display device of claim 12, wherein a second driving voltage to drive the pixel is applied to the pixel, wherein the second driving voltage is lower than the first driving voltage, wherein the second driving voltage has a first driving level in the first mode and the second mode, wherein the second driving voltage in the third mode has a second driving level lower than the first driving level, and wherein the second driving voltage in the fourth mode has a third driving level lower than the second driving level.

16. The display device of claim 1, wherein the pixel includes:

a light emitting element;

a driving transistor including a control electrode, a first electrode and a second electrode;

a first transistor including a control electrode configured to receive a first gate signal, a first electrode configured to receive the data voltage and a second electrode connected to a first electrode of a first capacitor;

a second transistor including a control electrode configured to receive a second gate signal, a first electrode connected to the first electrode of the first capacitor and a second electrode configured to receive the reference voltage; and the first capacitor including the first electrode connected to the second electrode of the first transistor and a second electrode connected to the control electrode of the driving transistor.

17. A display device comprising:

a display panel including a pixel; and a panel driver configured to provide a reference voltage and a data voltage to the pixel, wherein the panel driver includes a power management circuit configured to generate an analog power supply voltage, and to provide the analog power supply voltage to a data driver, wherein the power management circuit is configured to control the analog power supply voltage according to a luminance for a first grayscale value, and wherein the pixel includes:

a light emitting element;

a driving transistor including a control electrode, a first electrode and a second electrode;

a first transistor including a control electrode configured to receive a first gate signal, a first electrode configured to receive the data voltage and a second electrode connected to a first electrode of a first capacitor;

a second transistor including a control electrode configured to receive a second gate signal, a first electrode connected to the first electrode of the first capacitor and a second electrode configured to receive the reference voltage; and the first capacitor including the first electrode connected to the second electrode of the first transistor and a second electrode connected to the control electrode of the driving transistor.

18. An electronic device comprising:

a display panel including a pixel;

a data driver configured to generate a data voltage and to provide the data voltage to the pixel;

a power management circuit configured to generate an analog power supply voltage and to provide the analog power supply voltage to the data driver;

a controller configured to control the power management circuit and the data driver; and a processor configured to provide input image data and an input control signal to the controller, wherein the pixel is configured to emit a light at a luminance corresponding to a difference between a reference voltage and the data voltage, wherein a driving mode of the electronic device includes a first mode in which the pixel is configured to emit a light at a first luminance for a first grayscale value and a second mode in which the pixel is configured to emit a light at a second luminance higher than the first luminance of the first mode for the first grayscale value, wherein, in the first mode, the power management circuit is configured to generate the analog power supply voltage having a first analog power supply voltage level and to provide the analog power supply voltage having the first analog power supply voltage level to the data driver, and the data driver is configured to generate the data voltage based on the analog power supply voltage having the first analog power supply voltage level, and wherein, in the second mode, the power management circuit is configured to generate the analog power supply voltage having a second analog power supply voltage level higher than the first analog power supply voltage level and to provide the analog power supply voltage having the second analog power supply voltage level to the data driver, and the data driver is configured to generate the data voltage based on the analog power supply voltage having the second analog power supply voltage level.

19. The electronic device of claim 18, wherein the reference voltage in the first mode has a first reference voltage level lower than the first analog power supply voltage level, and wherein the reference voltage in the second mode has a second reference voltage level higher than the first reference voltage level.

20. The electronic device of claim 19, wherein the data voltage corresponding to a minimum grayscale value is a minimum grayscale voltage, wherein the minimum grayscale voltage in the first mode has a first minimum grayscale voltage level lower than the first analog power supply voltage level and higher than the first reference voltage level, and wherein the minimum grayscale voltage in the second mode has a second minimum grayscale voltage level higher than the first minimum grayscale voltage level.

* * * * *